US011816817B2

(12) United States Patent
Lim et al.

(10) Patent No.: US 11,816,817 B2
(45) Date of Patent: Nov. 14, 2023

(54) METHOD AND APPARATUS FOR PROCESSING AN IMAGE

(71) Applicant: SAMSUNG ELECTRONICS CO., LTD., Suwon-si (KR)

(72) Inventors: Kyungmin Lim, Suwon-si (KR); Seunghyun Lee, Suwon-si (KR); Jaesung Lee, Suwon-si (KR); Sunil Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/831,032

(22) Filed: Jun. 2, 2022

(65) Prior Publication Data

US 2022/0383461 A1 Dec. 1, 2022

Related U.S. Application Data

(63) Continuation of application No. PCT/KR2022/006823, filed on May 12, 2022.

(30) Foreign Application Priority Data

May 20, 2021 (KR) .................. 10-2021-0064863

(51) Int. Cl.
*G06T 5/00* (2006.01)
*G06T 5/20* (2006.01)
*G09G 3/00* (2006.01)

(52) U.S. Cl.
CPC .............. *G06T 5/009* (2013.01); *G06T 5/008* (2013.01); *G06T 5/20* (2013.01); *G09G 3/001* (2013.01);

(Continued)

(58) Field of Classification Search
CPC ... G09G 2320/0209; G09G 2320/0276; G09G 2320/029; G09G 3/001; G06T 5/009; G06T 5/008; G06T 5/20; G06T 2207/20208
See application file for complete search history.

(56) References Cited

U.S. PATENT DOCUMENTS 9,595,128 B2 3/2017 Barenbrug
9,866,825 B2 1/2018 Baik et al.
(Continued)

FOREIGN PATENT DOCUMENTS

KR 10-2011-0073670 A 6/2011
KR 10-2012-0119905 A 10/2012
(Continued)

OTHER PUBLICATIONS

Li, Dongxiao et al., "3D Synthesis and Crosstalk Reduction for Lenticular Autostereoscopic Displays", Journal Of Display Technology, vol. 11, No. 11, Nov. 2015, pp. 939-946. (8 pages total).

(Continued)

*Primary Examiner* — Amare Mengistu
*Assistant Examiner* — Jennifer L Zubajlo
(74) *Attorney, Agent, or Firm* — Sughrue Mion, PLLC

(57) ABSTRACT

A method includes: obtaining a plurality of view images; identifying a representative value from among difference values between values of a plurality of sub-pixels corresponding to a first position in the plurality of view images and an intermediate value of a bit range of a display; determining filtering strength corresponding to the representative value, based on a correspondence map indicating a correspondence relationship between filtering strength and a difference value between a value of a sub-pixel and the intermediate value; and applying a filter having the determined filtering strength to the plurality of sub-pixels corre- (Continued)

sponding to the first position, wherein a value resulting from applying the filter having the determined filtering strength to the plurality of sub-pixels corresponding to the first position is included in a range of sub-pixel values according to the bit range of the display.

20 Claims, 30 Drawing Sheets

(52) U.S. Cl.
CPC .............. *G06T 2207/20208* (2013.01); *G09G 2320/029* (2013.01); *G09G 2320/0209* (2013.01); *G09G 2320/0276* (2013.01)

(56) References Cited

U.S. PATENT DOCUMENTS

| | | | | |
|---|---|---|---|---|
| 10,136,122 | B2* | 11/2018 | Kang | G02B 30/27 |
| 10,621,710 | B2* | 4/2020 | Gim | G06T 5/009 |
| 10,931,939 | B2* | 2/2021 | Park | H04N 13/324 |
| 11,561,427 | B2 | 1/2023 | Li | |
| 2011/0157161 | A1* | 6/2011 | Choi | G09G 3/003 |
| | | | | 345/419 |
| 2012/0262544 | A1* | 10/2012 | Damera-Venkata | H04N 13/327 |
| | | | | 348/E13.064 |
| 2015/0092026 | A1* | 4/2015 | Baik | H04N 13/373 |
| | | | | 348/54 |
| 2017/0111633 | A1* | 4/2017 | Kang | H04N 13/317 |
| 2017/0374346 | A1* | 12/2017 | Borel | H04N 13/122 |
| 2020/0053358 | A1* | 2/2020 | Moon | H04N 19/136 |
| 2020/0074911 | A1* | 3/2020 | Park | H04N 13/122 |
| 2020/0120340 | A1* | 4/2020 | Park | G06T 9/002 |

FOREIGN PATENT DOCUMENTS

| | | |
|---|---|---|
| KR | 10-2015-0035117 A | 4/2015 |
| KR | 10-2017-0044953 A | 4/2017 |
| KR | 10-2017-0098235 A | 8/2017 |
| KR | 10-2089323 B1 | 3/2020 |
| KR | 10-2140080 B1 | 7/2020 |
| KR | 10-2454391 B1 | 10/2022 |

OTHER PUBLICATIONS

International Search Report (PCT/ISA/220 and PCT/ISA/210) and Written Opinion (PCT/ISA/237) dated Aug. 12, 2022 by the International Searching Authority in International Application No. PCT/KR2022/006823.

* cited by examiner

VIEW IMAGE 720

VIEW IMAGE 740

⋮

VIEW IMAGE 760

CROSSTALK MAP 780

METHOD AND APPARATUS FOR PROCESSING AN IMAGE

CROSS-REFERENCE TO THE RELATED APPLICATION(S)

This application is a bypass continuation application of International Application No. PCT/KR2022/006823, filed May 12, 2022, in the Korean Intellectual Property Receiving Office and claiming priority to Korean Patent Application No. 10-2021-0064863, filed on May 20, 2021, the disclosures of which are incorporated by reference herein in their entireties.

BACKGROUND

1. Field

The present disclosure relates to a method of processing an image and an electronic apparatus therefor.

2. Description of the Related Art

Recently, a display capable of displaying different images so that a user can watch the different images according to the position of the user has been introduced, and it is desirable to effectively reduce crosstalk. Crosstalk refers to a phenomenon in which view images are partially mixed as light emitted from adjacent pixels overlap each other.

The related art technology applies a filter with fixed filtering strength to all sub-pixels in a plurality of view images to reduce crosstalk. In this case, when a filter of high filtering strength is applied to all sub-pixels, a filtered result value may be out of a sub-pixel value range according to the bit range of a display, and when a filter of low filtering strength is applied to all sub-pixels, there is a limitation that a filtering effect is insignificant.

In order to solve the problem that the filtered result value is out of the sub-pixel value range according to the bit range of a display, a dynamic range of a plurality of view images may be reduced before filtering. However, there still is a problem that the filtered view images may be distorted.

SUMMARY

The present disclosure provides a method of processing an image and an electronic apparatus therefor.

According to an aspect of an example embodiment, provided is a method including: obtaining a plurality of view images; identifying a representative value from among difference values between values of a plurality of sub-pixels corresponding to a first position in the plurality of view images and an intermediate value of a bit range of a display; determining a filtering strength corresponding to the representative value, based on a correspondence map indicating a correspondence relationship between a filtering strength and a difference value between a value of a sub-pixel and the intermediate value; and applying a filter having the determined filtering strength to the plurality of sub-pixels corresponding to the first position, wherein a value, resulting from applying the filter having the determined filtering strength to the plurality of sub-pixels corresponding to the first position, is included in a range of sub-pixel values according to the bit range of the display.

The representative value may include a maximum value from among the difference values between the values of the plurality of sub-pixels corresponding to the first position in the plurality of view images and the intermediate value of the bit range of the display.

Based on an increase in the filtering strength, a weight applied to values of sub-pixels of a current view image and peripheral view images, adjacent to the current view image for filtering of sub-pixels of the current view image may increase.

Based on a decrease in the difference value between the value of the sub-pixel and the intermediate value, the filtering strength corresponding to the difference value may increase.

The filter having the filtering strength determined for each of positions in the plurality of view images based on the correspondence map may be applied to sub-pixels for each of the positions in the plurality of view images.

The method may further include: performing gamma correction on the values of the plurality of sub-pixels; and performing inverse gamma correction on values of the plurality of sub-pixels that are changed by applying the filter having the determined filtering strength corresponding to the representative value. The identifying of the representative value may include identifying the representative value from among difference values between a plurality of brightness values of the plurality of sub-pixels and an intermediate value of a range of brightness values of sub-pixel.

The identifying of the representative value may include: identifying at least one outlier from among the difference values between the values of the plurality of sub-pixels and the intermediate value of the bit range of the display; and identifying the representative value from among the difference values except the at least one outlier.

The identifying of the representative value may include: identifying one or more sub-pixels that are not used for rendering from among the plurality of sub-pixels; and identifying the representative value from among difference values between values of the plurality of sub-pixels and the intermediate value of the bit range of the display, except values of the identified one or more sub-pixels.

The first position may include a local area.

The identifying of the representative value may include: identifying a predetermined number of adjacent first view images from among the plurality of view images; identifying a predetermined number of adjacent second view images from among the plurality of view images; identifying a first maximum value among difference values between values of sub-pixels corresponding to the first position in the first view images and the intermediate value of the bit range of the display; identifying a second maximum value among difference values between values of sub-pixels corresponding to the first position in the second view images and the intermediate value of the bit range of the display; and identifying the representative value from among the first maximum value and the second maximum value.

According to an aspect of an example embodiment, provided is an electronic apparatus including: a memory configured to store at least one instruction; and at least one processor, wherein the at least one processor is configured to, by executing the at least one instruction: obtain a plurality of view images; identify a representative value from among difference values between values of a plurality of sub-pixels corresponding to a first position in the plurality of view images and an intermediate value of a bit range of a display; determine a filtering strength corresponding to the representative value, based on a correspondence map indicating a correspondence relationship between filtering strength and a difference value between a value of a sub-pixel and the intermediate value; and apply a filter having the determined filtering strength to the plurality of sub-pixels corresponding to the first position, and wherein a value resulting from applying the filter having the determined filtering strength to the sub-pixels corresponding to the first position is included in a range of sub-pixel values according to the bit range of the display.

The representative value may include a maximum value from among the difference values between the values of the plurality of sub-pixels corresponding to the first position in the plurality of view images and the intermediate value of the bit range of the display.

Based on an increase in the filtering strength, a weight applied to values of sub-pixels of a current view image and peripheral view images adjacent to the current view image for filtering of sub-pixels of a current view image may increase.

Based on a decrease in the difference value between the value of the sub-pixel and the intermediate value, the filtering strength corresponding to the difference value may increase.

The filter having the filtering strength determined for each of positions in the plurality of view images based on the correspondence map may be applied to sub-pixels for each of the positions in the plurality of view images.

The at least one processor may be further configured to: perform gamma correction on the values of the plurality of sub-pixels; and perform inverse gamma correction on values of the plurality of sub-pixels that are changed by applying the filter having the determined filtering strength corresponding to the representative value, and the at least one processor may be configured to identify the representative value from among difference values between a plurality of brightness values of the plurality of sub-pixels and an intermediate value of a range of brightness values of sub-pixel.

The at least one processor may be further configured to: identify at least one outlier from among the difference values between the values of the plurality of sub-pixels and the intermediate value of the bit range of the display; and identify the representative value from among the difference values except the at least one outlier.

The at least one processor may be further configured to: identify one or more sub-pixels that are not used for rendering from among the plurality of sub-pixels; and identify the representative value from among the difference values between values of the plurality of sub-pixels except values of the one or more sub-pixels and the intermediate value of the bit range of the display.

The first position may include a local area.

According to an aspect of an example embodiment, provided is a non-transitory computer-readable storage medium having stored thereon a program, which, when executed by at least one processor, causes the at least one processor to perform the above-described method(s).

BRIEF DESCRIPTION OF DRAWINGS

The above and other aspects, features, and advantages of certain embodiments of the present disclosure will be more apparent from the following description taken in conjunction with the accompanying drawings, in which.

DETAILED DESCRIPTION

Figure 1:
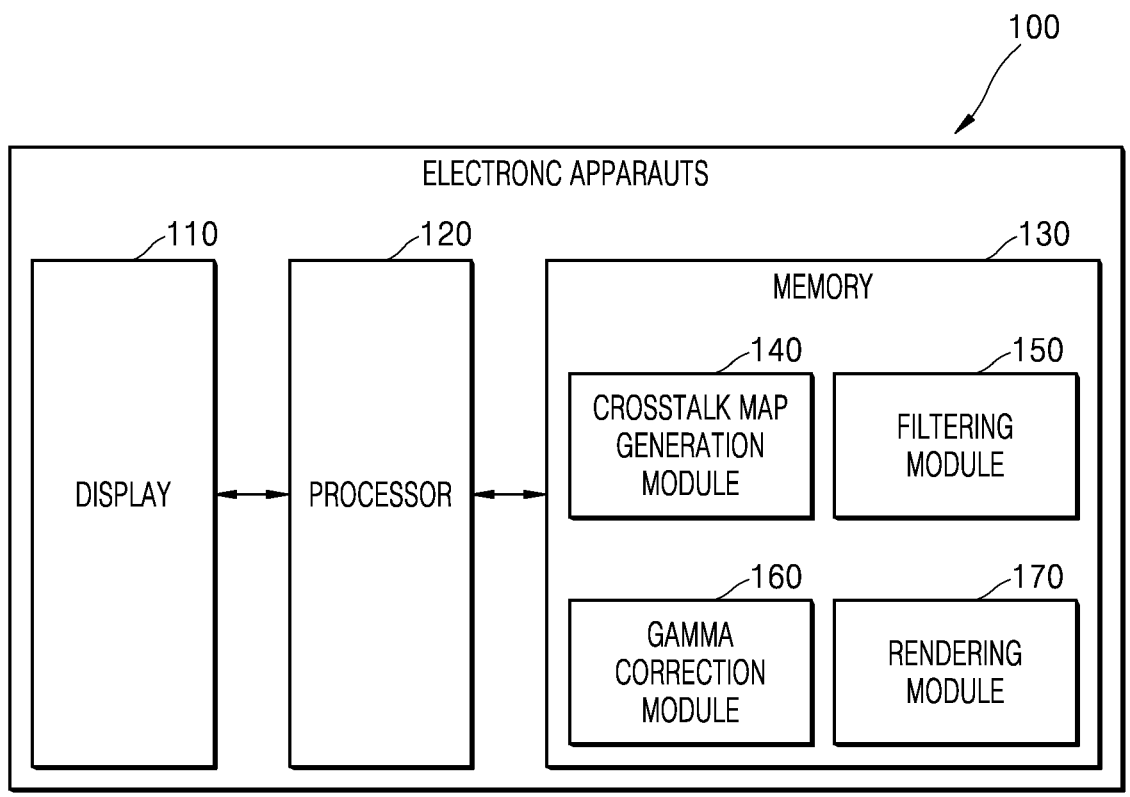
FIG. 1 is a block diagram of an electronic apparatus according to an embodiment of the present disclosure.

Hereinafter, one or more example embodiments of the present disclosure is described in detail with reference to the accompanying drawings.

In the present disclosure, expressions such as "at least one of a, b, or c" may denote "a", "b", "c", "a and b", "a and c", "b and c", "all of a, b, and c", or modifications thereof.

The present specification does not describe all components of the embodiments, and general contents, well-known technologies, or redundant contents in the embodiments in the technical field to which the embodiments of the disclosure are pertinent are omitted. This is to further clearly deliver the gist of the present invention, without obscuring the same, by omitting unnecessary descriptions.

For the same reason, some constituent elements may be exaggerated, omitted, or schematically illustrated in the accompanying drawings. Furthermore, the size of each constituent element may not fully reflect the actual size. In each drawing, the same or corresponding constituent elements are indicated by the same reference numeral.

Advantages and features of the present disclosure and methods of accomplishing the same may be understood more readily by reference to the following detailed description of embodiments and the accompanying drawings. However, the present embodiments may be implemented in various forms, not by being limited to the embodiments presented below. The present embodiments are provided to further completely explain the disclosure to one of ordinary skill in the art to which the disclosure pertains. However, the disclosure is not limited thereto and it will be understood that various changes in form and details may be made therein without departing from the spirit and scope of the following claims. That is, descriptions on particular structures or functions may be presented merely for explaining embodiments of the disclosure. Like references indicate like constituent elements throughout the drawings.

It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks. These computer program instructions may also be stored in a computer readable medium that when executed may direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Furthermore, each block in the flowchart or block diagrams may represent a module, segment, or portion of instructions, which comprises one or more executable instructions for implementing the specified logical function (s). In some alternative implementations, the functions noted in the block may occur out of the order noted in the figures. For example, two blocks shown in succession may be executed substantially concurrently, or the blocks may sometimes be executed in the reverse order, depending upon the functionality involved.

The computer-readable storage media may be provided in the form of non-transitory storage media. Here, "non-transitory" merely means that the storage media do not contain signals only and are tangible, but do not distinguish data being semi-permanently or temporarily stored in the storage media. In an example, a non-transitory storage medium may include a buffer in which data is temporarily stored.

According to an embodiment, the method according to various embodiments may be provided by being included in a computer program product. A computer program product as goods may be dealt between a seller and a buyer. A computer program product may be distributed directly or online (e.g., download or upload) in the form of a device-readable storage medium (e.g., compact disc read only memory (CD-ROM)), or through an application store (e.g., PlayStore™) or through two user devices (e.g., smartphones). In the case of online distribution, at least part of a computer program product (e.g., a downloadable application) may be at least temporarily stored or may be temporarily created on a device-readable storage medium such as a manufacturer's server, an application store's server, or a memory of a relay server.

In the present disclosure, crosstalk refers to a phenomenon in which view images are partially mixed due to overlapping of light emitted from adjacent pixels in an electronic apparatus including a display.

In the present disclosure, a crosstalk map means a map in which a value of a predetermined position represents a representative value among difference values between values of sub-pixels at the same position of a plurality of view images and an intermediate value of a bit range of a display.

In the present disclosure, a sub-pixel constituting one pixel may mean a sub-pixel of any one color component among R, G, and B color components constituting the pixel, or a sub-pixel of any one color component among Y, U, and V color components constituting the pixel. In the present disclosure, sub-pixels at a certain position in a plurality of images may mean sub-pixels of any one color component among R, G, and B color components constituting pixels at the same position in the images, or a sub-pixel of any one color component among Y, U, and V color components constituting the pixels at the same position. The above definition assumes that the embodiment of the present disclosure follows the RGB color format or the YUV color format, and even if other color formats are followed, a sub-pixel may mean a sub-pixel of any one color component.

FIG. 1 is a block diagram of an electronic apparatus 100 according to an embodiment of the present disclosure.

According to an embodiment, the electronic apparatus 100 may include a display 110, a processor 120, and a memory 130. However, the configuration of the electronic apparatus 100 is not limited to the above description, and the electronic apparatus 100 may include more or less constituent elements.

The display 110 may display various contents such as text, images, videos, icons, or signs. According to an embodiment, the display 110 may include at least one of a liquid crystal display (LCD), a light-emitting diode (LED) display, an organic light-emitting diode (OLED) display, a quantum dot light-emitting diode (QLED) display, a microelectromechanical systems (MEMS) display, or an electronic paper display, but the present disclosure is not limited thereto.

According to an embodiment, the display 110 may mean an autostereoscopic display. For example, the display 110 may mean a display that enables a user to watch different images according to a watching position by using a lenticular lens, a parallax barrier, or the like, but the present disclosure is not limited thereto.

The processor 120 may control the overall operation of the electronic apparatus 100 by executing at least one instruction stored in the memory 130.

For example, the processor 120 may obtain a plurality of view images.

The processor 120 may identify a representative value among difference values between values of a plurality of sub-pixels corresponding to a first position in a plurality of view images and an intermediate value of a bit range of a display.

The processor 120 may determine filtering strength corresponding to the representative value based on a correspondence map indicating a correspondence relationship between the filtering strength and the difference values between the values of the sub-pixels and the intermediate value in the bit range of the display.

The processor 120 may apply a filter having the determined filtering strength to the sub-pixels corresponding to the first position. A value resulting from the application of the filter having the determined filtering strength to the sub-pixels corresponding to the first position may be included in a pixel value range according to the bit range of the display.

The memory 130 may include a crosstalk map generation module 140, a filtering module 150, a gamma correction module 160, and a rendering module 170.

The crosstalk map generation module 140 may store instructions to identify the representative value among the difference values between the values of sub-pixels for each position in a plurality of view images and the intermediate value in the bit range of the display, and to generate a crosstalk map based thereon.

The filtering module 150 may store instructions to apply, based on the crosstalk map, a filter of the filtering strength corresponding to the representative value from among the difference values between the values of sub-pixels for each sub-pixel according to a position in a plurality of view images and the intermediate value in the bit range of the display.

The gamma correction module 160 may store instructions to perform a gamma correction on the values of a plurality of sub-pixels, and an inverse gamma correction on the values of a plurality of sub-pixels that are changed by applying the filter having filtering strength corresponding to the representative value.

The rendering module 170 may store instructions to render the changed view images, and identify one or more sub-pixels that are not used for rendering.

Figure 2:
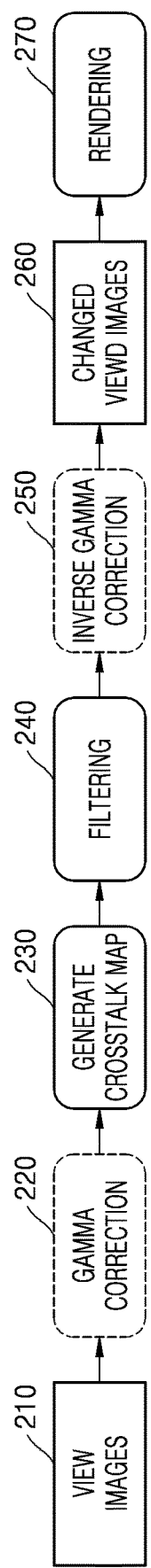
FIG. 2 is a view for explaining a process in which an electronic apparatus filters a plurality of view images, according to an embodiment of the present disclosure.

FIG. 2 is a view for explaining a process in which the electronic apparatus 100 filters a plurality of view images, according to an embodiment of the present disclosure. In this drawing, a rectangle denotes an image and a rounded rectangle denotes an operation.

Referring to FIG. 2, the electronic apparatus 100 may obtain a plurality of view images 210. According to an embodiment, the view images 210 may mean images obtained by capturing different scenes to enable a user to watch different images according to a user's watching positions. For example, the view images 210 may mean images of one object captured at various angles to enable a user to watch the object in directions corresponding to a plurality of watching positions. Alternatively, the view images 210 may mean images obtained by capturing various objects to enable a user to watch different objects according to watching positions.

According to another embodiment, the view images 210 may mean images obtained by capturing different scenes to enable a user to watch different images through the left eye and the right eye of the user. For example, the view images 210 may mean images obtained by capturing one object at various angles to enable a user to watch an image from different points of view through the left eye and the right eye of the user, that is, a three-dimensional (3D) image. However, this is merely an embodiment, and the view images 210 is not limited to the above-described embodiment.

The electronic apparatus 100 may perform generating a crosstalk map (operation 230) based on the view images 210. According to an embodiment, the electronic apparatus 100 may identify a representative value among difference values between values of sub-pixels for each sub-pixel according to a position in the view images 210 and the intermediate value in the bit range of the display, and generate a crosstalk map based thereon. For example, the electronic apparatus 100 may identify a maximum value among the difference values between the values of the sub-pixels corresponding to the first position in the view images 210 and the intermediate value in the bit range of the display, and set the identified maximum value as a value of the first position in the crosstalk map. In this regard, a detailed description will be presented below with reference to FIG. 3A.

According to an embodiment, the electronic apparatus 100 may identify a representative value among difference values between values of sub-pixels for each sub-pixel according to a local area in the view images 210 and the intermediate value in the bit range of the display, and generate a crosstalk map based thereon. For example, the electronic apparatus 100 may identify a maximum value among difference values between values of a plurality of sub-pixels corresponding to a first area in the view images 210 and the intermediate value in the bit range of the display, and set the identified maximum value as a value of the first area in the crosstalk map. In this regard, a detailed description will be presented below with reference to FIG. 3B.

According to an embodiment, the electronic apparatus 100 may identify an outlier(s) from among the values of the sub-pixels corresponding to the first position in the view images 210, and identify a representative value among difference values between the values of sub-pixels except the outlier(s) and the intermediate value in the bit range of the display. The electronic apparatus 100 may generate a crosstalk map based on the identified representative value. In this regard, a detailed description will be presented below with reference to FIG. 5A.

According to another embodiment, the electronic apparatus 100 may identify an outlier(s) from among the difference values between the values of the sub-pixels corresponding to the first position in the view images 210 and the intermediate value in the bit range of the display, and identify a representative value among the difference values except the outlier(s). The electronic apparatus 100 may generate a crosstalk map based on the identified representative value. In this regard, a detailed description will be presented below with reference to FIG. 5B.

According to an embodiment, the electronic apparatus 100 may identify one or more sub-pixels that are not used for rendering among the sub-pixels corresponding to the first position in the view images 210. The electronic apparatus 100 may identify a representative value among the difference values between the values of sub-pixels except the identified one or more sub-pixels and the intermediate value in the bit range of the display, and generate a crosstalk map based thereon. Accordingly, an amount of calculation needed to generate a crosstalk map may be reduced.

According to an embodiment, the electronic apparatus 100 may cluster the values of sub-pixels for each sub-pixel according to a position in the view images 210 into two or more clusters. The electronic apparatus 100 may identify a representative value among the difference values between the values of sub-pixels included in each of the two or more clusters and the intermediate value in the bit range of the display, and generate a crosstalk map based thereon. For example, the electronic apparatus 100 may cluster the values of the sub-pixels corresponding to the first position in the view images 210 into two or more clusters. The electronic apparatus 100 may identify a maximum value among the difference values between the values of sub-pixels included in each of two or more clusters and the intermediate value in the bit range of the display, and set the value of the first position in the crosstalk map to include each maximum value. In this regard, a detailed description will be presented below with reference to FIG. 6A.

According to another embodiment, the electronic apparatus 100 may cluster the difference values between the values of the sub-pixels for each sub-pixel according to a position in the view images 210 and the intermediate value in the bit range of the display into two or more clusters. The electronic apparatus 100 may identify each representative value among the difference values included in each of two or more clusters, and generate a crosstalk map based thereon. For example, the electronic apparatus 100 may cluster the difference values between the values of the sub-pixels corresponding to the first position in the view images 210 and the intermediate value in the bit range of the display into two or more clusters. The electronic apparatus 100 may identify a maximum value among the difference values included in each of two or more clusters, and set the value of the first position in the crosstalk map to include each maximum value. In this regard, a detailed description will be presented below with reference to FIG. 6B.

The electronic apparatus 100 may perform filtering (operation 240) on the view images 210 based on the crosstalk map. According to an embodiment, the electronic apparatus 100 may apply, based on the crosstalk map, a filter having filtering strength corresponding to the representative value among the difference values between the values of sub-pixels for each sub-pixel according to a position in the view images 210 and the intermediate value in the bit range of the display, to sub-pixels. For example, the electronic apparatus 100 may determine filtering strength for each of positions in the plurality of view images based on the correspondence map indicating the correspondence relationship between the filtering strength and the difference values between the values of the sub-pixels for each of the positions in the plurality of view images and the intermediate value in the bit range of the display. According to an embodiment, the electronic apparatus 100 may determine filtering strength corresponding to the representative value among the difference values between the values of the sub-pixels corresponding to the first position in the view images 210 and the intermediate value in the bit range of the display, The electronic apparatus 100 may apply the filter having the determined filtering strength to the sub-pixels corresponding to the first position in the view images 210.

The value resulting from the application of the filter of the filtering strength determined based on the correspondence map according to an embodiment to the sub-pixels corresponding to the first position may be included in the pixel value range according to the bit range of the display. In other words, the correspondence map may determine optimal filtering strength at which overflow is not generated when a filter is applied to a certain sub-pixel, based on the difference values between the values of the sub-pixels and the intermediate value in the bit range of the display. The correspondence map is described in detail below with reference to FIG. 9C.

According to an embodiment, as filtering strength increases, for filtering of sub-pixels of a current view image, a weight applied to the values of sub-pixels of the current view image and peripheral view images adjacent to the current view image may be increased. Furthermore, as the difference values between the values of the sub-pixels and the intermediate value in the bit range of the display decreases, filtering strength corresponding to the difference value may be increased. In this regard, a detailed description will be presented below with reference to FIGS. 9A to 9E.

According to an embodiment, as the electronic apparatus 100 applies an optimal filter to each sub-pixel according to a position in the view images 210 based on the correspondence map, the generation of overflow in the entire area of the view images 210 may be prevented. Accordingly, the electronic apparatus 100 may effectively reduce crosstalk, thereby obtaining clear view images. In this regard, a detailed description will be presented below with reference to FIGS. 8A and 8B.

The electronic apparatus 100 may perform the filtering (operation 240) on the view images 210 to obtain changed view images 260. The electronic apparatus 100 may perform rendering (operation 270) on the changed view images 260.

The electronic apparatus 100 may perform gamma correction (operation 220) on the view images 210 according to an embodiment. For example, the electronic apparatus 100 may perform the gamma correction (operation 220) on the values of sub-pixels of the view images 210, thereby changing a value of a pixel domain to a value of a brightness domain.

The electronic apparatus 100 may identify a representative value among difference values between brightness values of sub-pixels for each sub-pixel according to a position in the view images 210 and an intermediate value of a range of brightness values of sub-pixels, according to an embodiment, and generate a crosstalk map based on the identified representative value. Furthermore, the electronic apparatus 100 may perform filtering (operation 240) on the view images 210 based on the crosstalk map according to an embodiment, thereby obtaining a filtered view images.

The electronic apparatus 100 may perform inverse gamma correction (operation 250) on the filtered view images according to an embodiment, thereby obtaining the changed view images 260. For example, the electronic apparatus 100 may perform the inverse gamma correction (operation 250) on the values of sub-pixels of the filtered view images, thereby converting the value of a brightness domain to the value of a pixel domain. The electronic apparatus 100 may perform rendering (operation 270) on view images 260 that is changed to the value of a pixel domain through the inverse gamma correction (operation 250).

However, the gamma correction (operation 220) and the inverse gamma correction (operation 250), which are not essential operations, may be omitted according to embodiments. In this regard, a detailed description will be presented below with reference to FIG. 10.

Figure 3A:
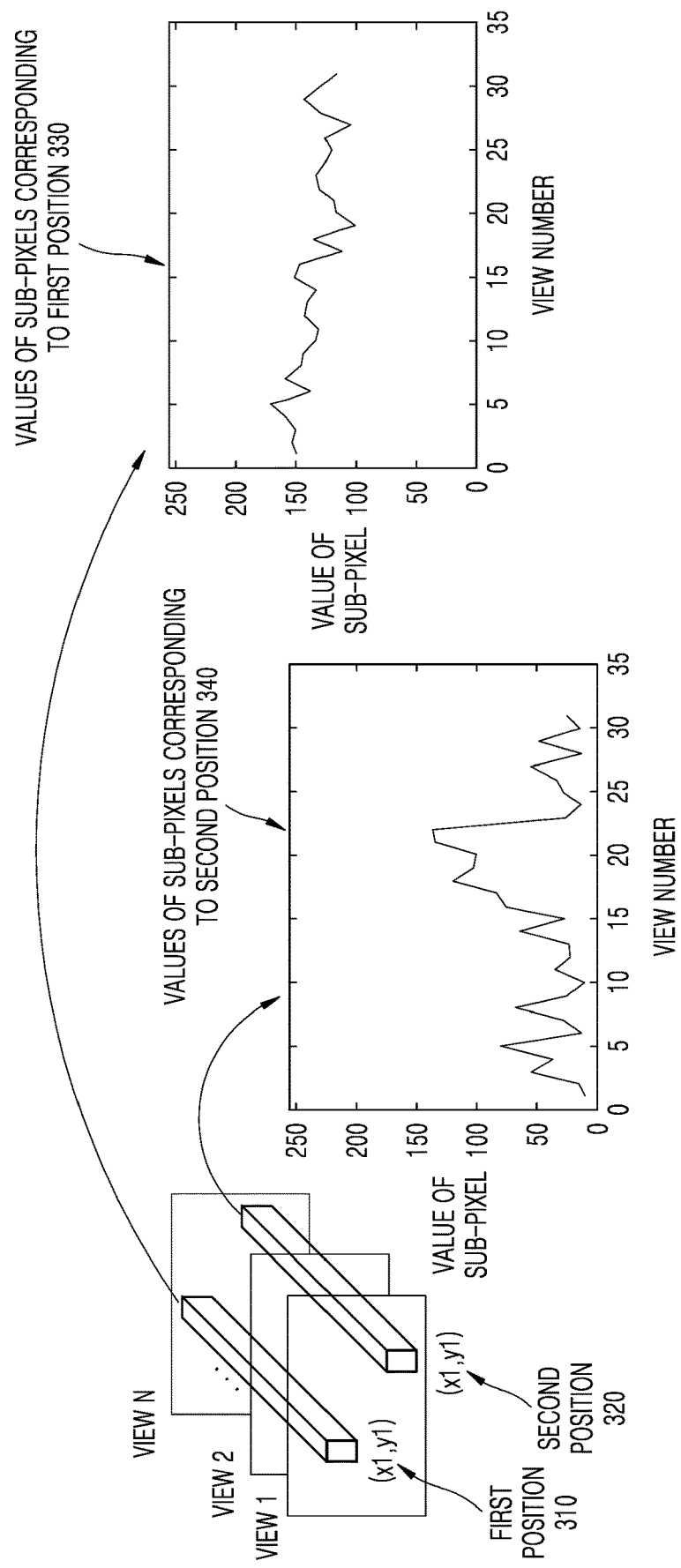
FIG. 3A is a view for explaining a process in which an electronic apparatus identifies values of sub-pixels for each sub-pixel according to a position in a plurality of view images, according to an embodiment of the present disclosure.

FIG. 3A is a view for explaining a process in which the electronic apparatus 100 identifies values of sub-pixels for each sub-pixel according to a position in a plurality of view images, according to an embodiment of the present disclosure.

Referring to FIG. 3A, the electronic apparatus 100 may identify a first position 310 or a second position 320 in a plurality of view images according to an embodiment. For example, when the electronic apparatus 100 obtains thirty-one (31) view images, the electronic apparatus 100 may identify the first position 310 corresponding to a coordinate $(x_1, y_1)$ in each view image of the thirty-one view images. Furthermore, the electronic apparatus 100 may identify the second position 320 corresponding to a coordinate $(x_2, y_2)$ in each view image of the thirty-one view images.

According to an embodiment, the electronic apparatus 100 may identify values 330 of a plurality of sub-pixels corresponding to the first position 310 or values 340 of a plurality of sub-pixels corresponding to the second position 320 in a plurality of view images. For example, the electronic apparatus 100 may identify values of thirty-one sub-pixels corresponding to the first position 310 of the thirty-one view images, and values of thirty-one sub-pixels corresponding to the second position 320 of the thirty-one view images.

According to an embodiment, a value of a sub-pixel may mean a value of a sub-pixel of any one color component of R, G and B color components or a value of a sub-pixel of any one color component of Y, U and V color components. For example, the values 330 of the sub-pixels corresponding to the first position 310 in a plurality of view images may be values of a Y color component of the sub-pixels corresponding to the first position 310. For example, when a color depth of a display is 8 bits, the value of a sub-pixel may mean a value between 0 and 255. When the electronic apparatus 100 performs gamma correction, the value of a sub-pixel may mean a brightness value that is non-linearly converted according to a gamma curve.

Figure 3B:
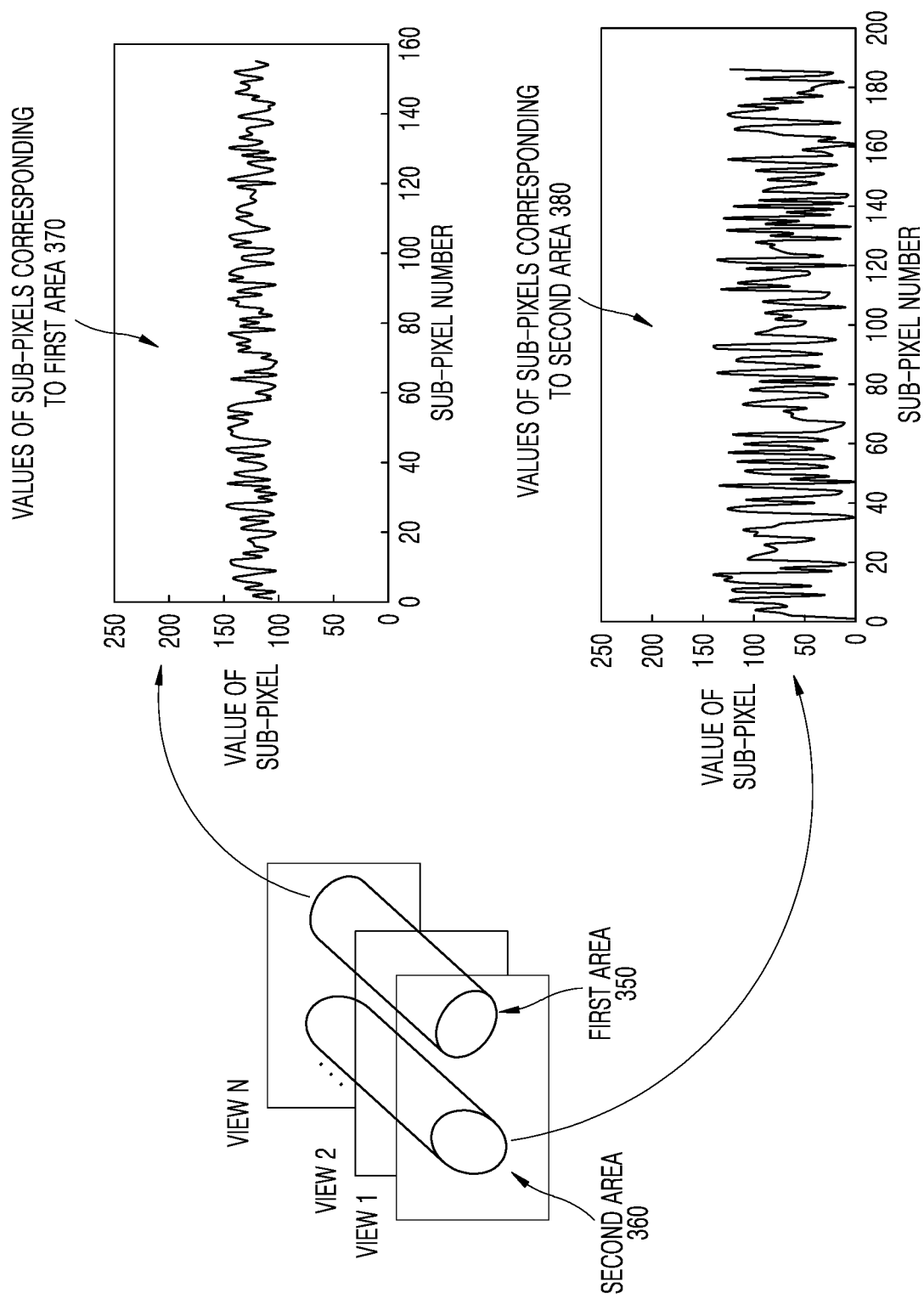
FIG. 3B is a view for explaining a process in which an electronic apparatus identifies values of sub-pixels for each sub-pixel according to an area in a plurality of view images, according to an embodiment of the present disclosure.

FIG. 3B is a view for explaining a process in which the electronic apparatus 100 identifies values of sub-pixels for each sub-pixel according to an area in a plurality of view images, according to an embodiment of the present disclosure. The area may include two or more adjacent sub-pixels in a view image.

Referring to FIG. 3B, the electronic apparatus 100 may identify a first area 350 or a second area 360 in a plurality of view images according to an embodiment. For example, when the electronic apparatus 100 obtains the thirty-one view images, the electronic apparatus 100 may identify the first area 350 including 5 adjacent sub-pixels in each view image of the thirty-one view images. Furthermore, the electronic apparatus 100 may identify the second area 360 including 6 adjacent sub-pixels in each view image of the thirty-one view images.

According to an embodiment, the electronic apparatus 100 may identify values 370 of a plurality of sub-pixels corresponding to the first area 350 in a plurality of view images or values 380 of a plurality of sub-pixels corresponding to the second area 360. For example, the electronic apparatus 100 may identify 155 values of sub-pixels corresponding to the first area 350 in the thirty-one view images, and identify 186 values of sub-pixels corresponding to the second area 360 in the thirty-one view images.

FIG. 4A to 4E are views for explaining a process in which the electronic apparatus 100 identifies a representative value among difference values between the values of sub-pixels for each sub-pixel according to a position in a plurality of view images and an intermediate value of a bit range of a display, according to an embodiment of the present disclosure.

Figure 4A:
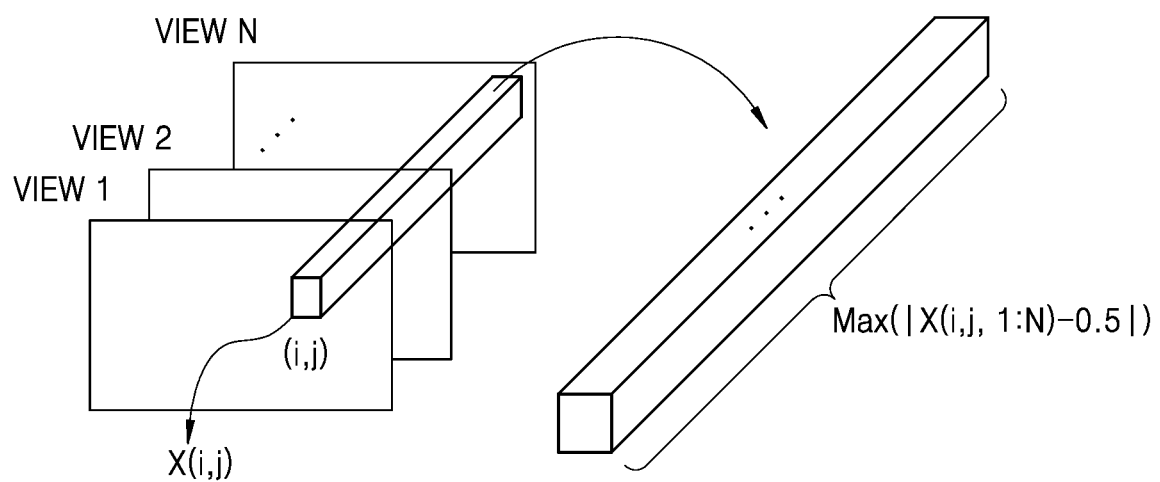
FIG. 4A is a view for explaining a process in which an electronic apparatus identifies a representative value among difference values between the values of sub-pixels for each sub-pixel according to a position in a plurality of view images and an intermediate value of a bit range of a display, according to an embodiment of the present disclosure.

Referring to FIG. 4A, the electronic apparatus 100 may identify a representative value among the difference values between the values of the sub-pixels corresponding to the first position in a plurality of view images and the intermediate value in the bit range of the display, according to an embodiment. For example, when the electronic apparatus 100 obtains N view images, the electronic apparatus 100 may identify a first position corresponding to a coordinate (i,j) in each view image of the N view images, and identify a value X(i,j) of a sub-pixel corresponding to the first position. The electronic apparatus 100 may identify difference values between the values X(i,j) of N sub-pixels and the intermediate value in the bit range of the display, and set the greatest value of the identified N difference values as a representative value.

According to an embodiment, when the values of sub-pixels are normalized to [0, 1], the electronic apparatus 100 may identify the representative value among the difference values between the values of the sub-pixels corresponding to the first position in a plurality of view images and the intermediate value in the bit range of the display, by using the following equation.

$$\text{Map\_idx}(i,j) = \text{Max}(|X(i,j,1:N) - 0.5|)$$

Here, Map_idx(i,j) may mean a representative value corresponding to the coordinate (i,j), and 0.5 may mean a normalized intermediate value in a bit range of a display.

Figure 4B:
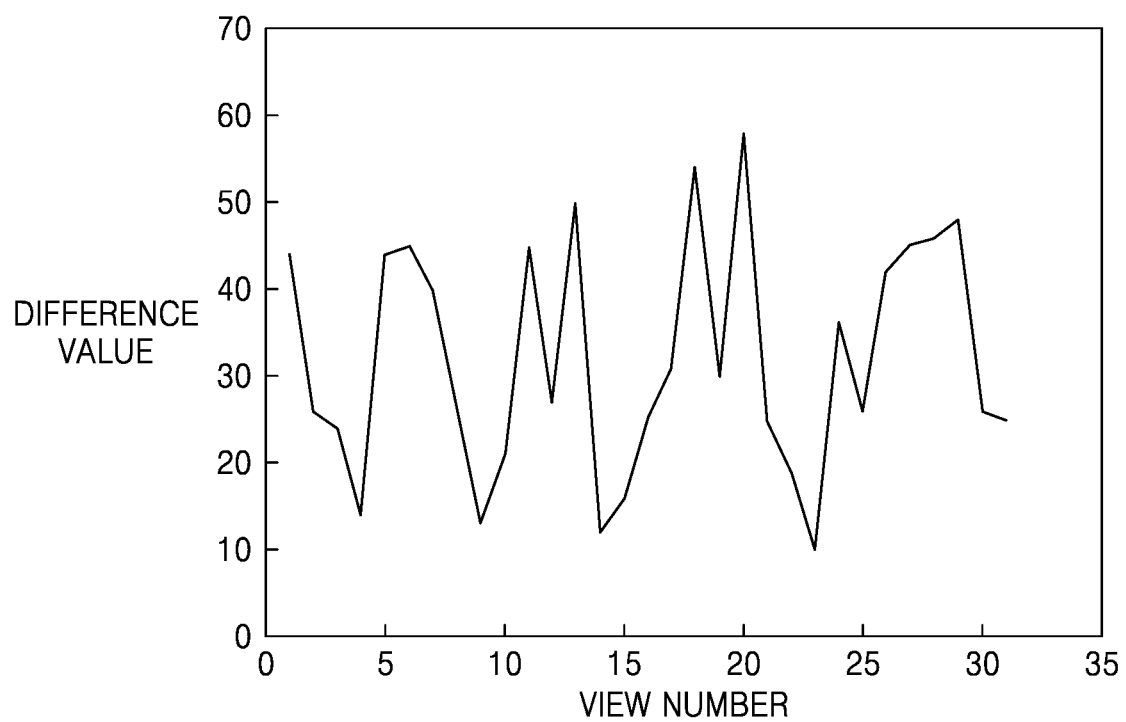
FIG. 4B is a view for explaining a process in which an electronic apparatus identifies the representative value among the difference values between the values of sub-pixels for each sub-pixel according to a position in a plurality of view images and the intermediate value in the bit range of a display, according to an embodiment of the present disclosure.

FIG. 4B illustrates an example of the difference values between the values of the sub-pixels corresponding to the first position in a plurality of view images and the intermediate value in the bit range of the display.

According to an embodiment, when the electronic apparatus 100 obtains the thirty-one view images, the electronic apparatus 100 may identify the difference values between values of the sub-pixels corresponding to the first position in the thirty-one view images and the intermediate value of the display. The electronic apparatus 100 may set a difference value of 58 between a value of a sub-pixel corresponding to the first position in the 20th view image and the intermediate value of the display, which is the greatest value from among the difference values, as a representative value of the first position.

Figure 4C:
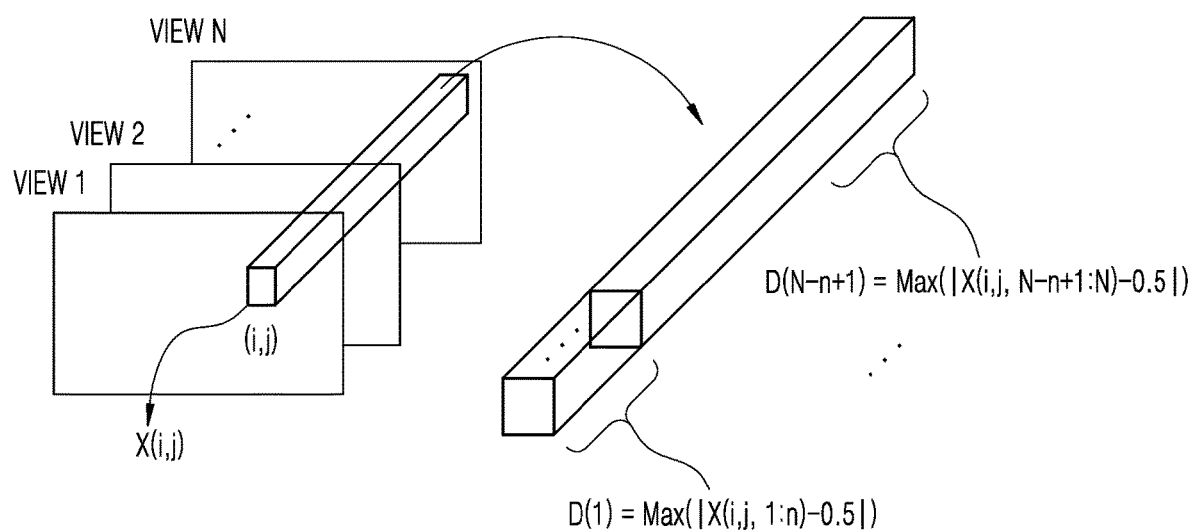
FIG. 4C is a view for explaining a process in which an electronic apparatus identifies the representative value among the difference values between the values of sub-pixels for each sub-pixel according to a position in a plurality of view images and the intermediate value in the bit range of a display, according to an embodiment of the present disclosure.

Referring to FIG. 4C, the electronic apparatus 100 may identify a maximum value among the difference values between the values of the sub-pixels corresponding to the first position in two or more adjacent view images of a plurality of view images and the intermediate value in the bit range of the display, according to an embodiment, and identify the maximum value as a representative value. For example, when the electronic apparatus 100 obtains N view images, the electronic apparatus 100 may identify the first position corresponding to the coordinate (i,j) in adjacent N view images of the N view images, and identify a value X(i,j) of a sub-pixel corresponding to the first position. The electronic apparatus 100 may identify difference values between the value X(i,j) of a sub-pixel with respect to the adjacent N view images and the intermediate value in the bit range of the display, and identify a maximum value among the identified n difference values. The electronic apparatus 100 may identify (N−n+1) maximum values by performing the process (N−n+1) times, and set the greatest value of the (N−n+1) maximum values as a representative value of the first position.

According to an embodiment, when the values of sub-pixels are normalized to [0, 1], the electronic apparatus 100 may identify the representative value among the difference values between the values of the sub-pixels corresponding to the first position in a plurality of view images and the intermediate value in the bit range of the display, by using the following equation.

$$D(k) = \text{Max}(|X(i,j,k:k+n-1) - 0.5|) \ (k=1,2,3,\ldots,N-n+1)$$

$$\text{Map\_idx}(i,j) = \text{Max}(D(1):D(N-n+1))$$

Here, D(k) may mean the maximum value from among the difference values between the values of a plurality of sub-pixels corresponding to the coordinate (i,j) in the adjacent N view images of the N view images and the intermediate value in the bit range of the display. 0.5 may mean a normalized intermediate value in the bit range of the display, and Map_idx(i,j) may mean a representative value of a position corresponding to the coordinate (i,j).

Figure 4D:
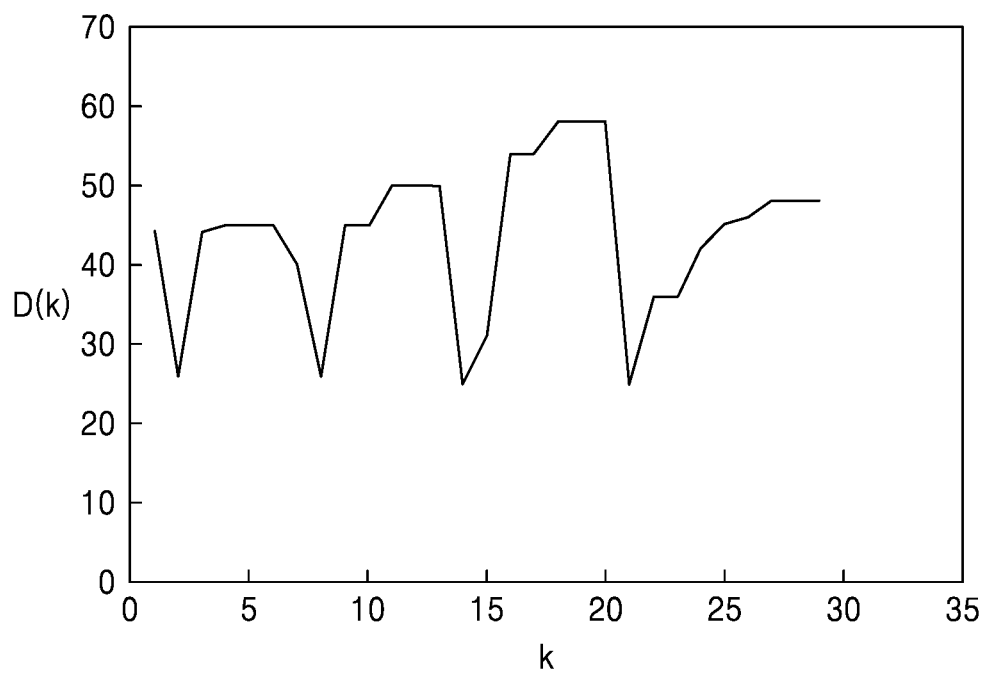
FIG. 4D is a view for explaining a process in which an electronic apparatus identifies the representative value among the difference values between the values of sub-pixels for each sub-pixel according to a position in a plurality of view images and the intermediate value in the bit range of a display, according to an embodiment of the present disclosure.

FIG. 4D illustrates an example of a maximum value from among the difference values between the values of the sub-pixels corresponding to the first position in two or more adjacent view images of a plurality of view images and the intermediate value in the bit range of the display, according to an embodiment of the present disclosure.

For example, when the electronic apparatus 100 obtains the thirty-one view images, the electronic apparatus 100 may identify a maximum value among the difference values between the values of the sub-pixels corresponding to the first position in three (3) adjacent view images of the thirty-one view images and the intermediate value of the display. The electronic apparatus 100 may identify twenty-nine (29) maximum values as illustrated in FIG. 4D by performing the above process twenty-nine (29) times, and set the greatest value of 58 among the twenty-nine maximum values as a representative value of the first position.

Figure 4E:
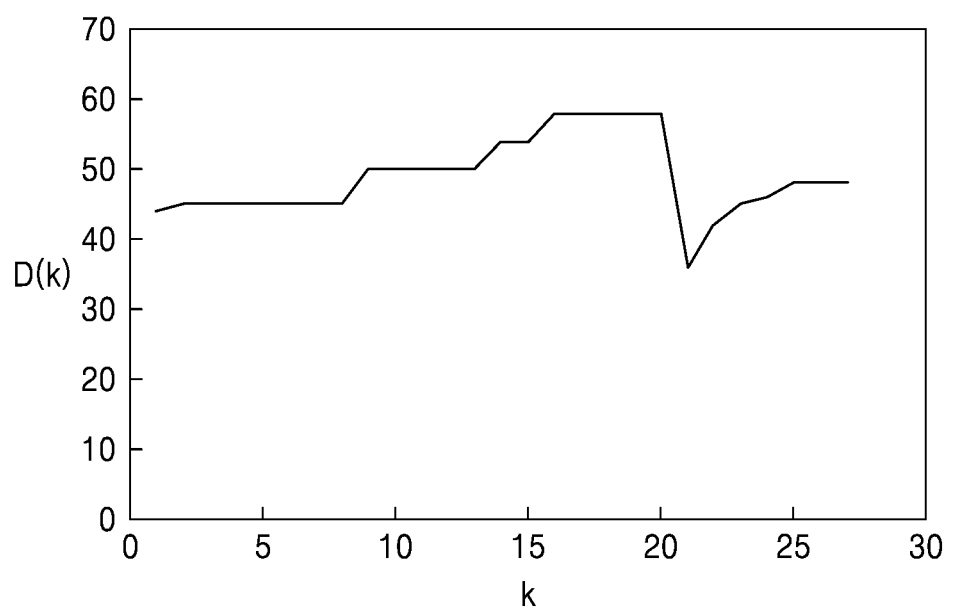
FIG. 4E is a view for explaining a process in which an electronic apparatus identifies the representative value among the difference values between the values of sub-pixels for each sub-pixel according to a position in a plurality of view images and the intermediate value in the bit range of a display, according to an embodiment of the present disclosure.

FIG. 4E illustrates an example of a maximum value from among the difference values between the values of the sub-pixels corresponding to the first position in two or more adjacent view images of a plurality of view images and the intermediate value in the bit range of the display, according to an embodiment of the present disclosure.

For example, when the electronic apparatus 100 obtains the thirty-one view images, the electronic apparatus 100 may identify a maximum value among the difference values between the values of the sub-pixels corresponding to the first position in five (5) adjacent view images of the thirty-one view images and the intermediate value of the display. The electronic apparatus 100 may identify twenty-seven

(27) maximum values as illustrated in FIG. 4E by performing the above process twenty-seven (27) times, and set the greatest value of 58 among the twenty-seven maximum values as a representative value of the first position.

The process in which the electronic apparatus 100 identifies a maximum value among the difference values between the values of sub-pixels corresponding to the first position in the two or more adjacent view images of a plurality of view images and the intermediate value of the display is merely one of is merely one of embodiments to identify a representative value, and accordingly the identified representative value may not vary. For example, even when the electronic apparatus 100 identifies twenty-nine maximum values with respect to the three adjacent view images as disclosed in relation to FIG. 4D, or the electronic apparatus 100 identifies twenty-seven maximum value with respect to the five adjacent view images as disclosed in relation to FIG. 4E, the representative value of the first position is identically 58, as disclosed in FIG. 4B.

Figure 5A:
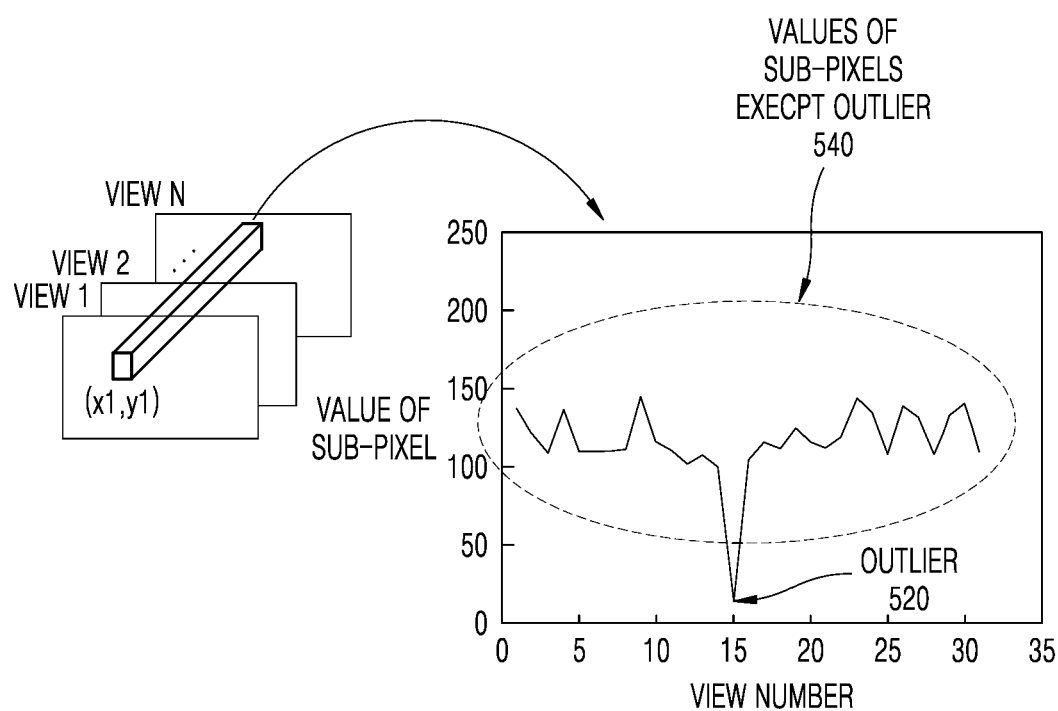
FIG. 5A is a view for explaining a process in which an electronic apparatus identifies a representative value among difference values between values of a plurality of sub-pixels corresponding to a first position in a plurality of view images, except one or more outliers, and the intermediate value in the bit range of a display, according to an embodiment of the present disclosure.
Figure 5B:
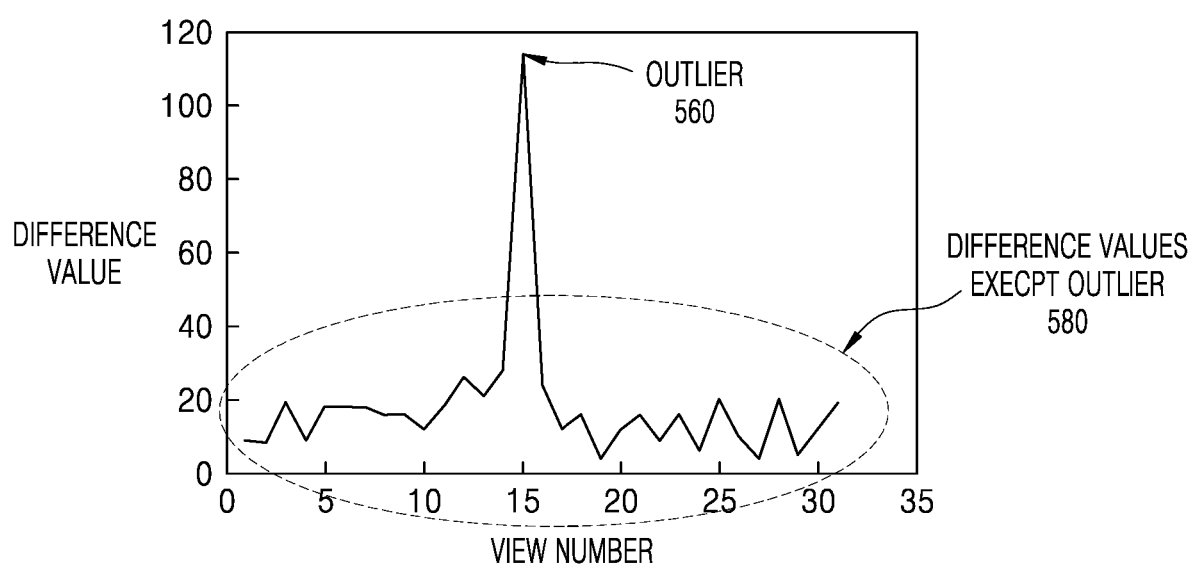
FIG. 5B is a view for explaining a process in which an electronic apparatus identifies the representative value among the difference values between the values of the sub-pixels corresponding to the first position in a plurality of view images, except one or more outliers, and the intermediate value in the bit range of a display, according to an embodiment of the present disclosure.

FIGS. 5A and 5B are views for explaining a process in which, according to embodiments of the present disclosure, the electronic apparatus 100 identifies a representative value among the difference values between the values of the sub-pixels corresponding to the first position in a plurality of view images and the intermediate value in the bit range of the display except one or more outliers, except one or more outliers.

Referring to FIG. 5A, the electronic apparatus 100 may identify one or more outliers among the values of the sub-pixels corresponding to the first position in a plurality of view images. For example, when the electronic apparatus 100 obtains the thirty-one view images, the electronic apparatus 100 may identify the first position corresponding to a coordinate ($x_1$, $y_1$) in each of the thirty-one view images, and identify the values of sub-pixels corresponding to the first position. The electronic apparatus 100 may identify one or more outliers 520 among the values of thirty-one sub-pixels by using an anomaly detection algorithm, and identify a representative value from among the difference values between values 540 of a plurality of sub-pixels, except the one or more outliers 520, and the intermediate value in the bit range of the display.

Referring to FIG. 5B, the electronic apparatus 100 may identify one or more outliers among the difference values between the values of the sub-pixels corresponding to the first position in a plurality of view images and the intermediate value in the bit range of the display. For example, when the electronic apparatus 100 obtains the thirty-one view images, the electronic apparatus 100 may identify the first position corresponding to the coordinate ($x_1$, $y_1$) in each of the thirty-one view images, and identify the difference values between the values of sub-pixels corresponding to the first position and the intermediate value in the bit range of the display. The electronic apparatus 100 may identify one or more outliers 560 among the thirty-one difference values by using the anomaly detection algorithm, and identify a representative value from among difference values 580, except the one or more outliers 560.

According to an embodiment, as the electronic apparatus 100 identifies a representative value except one or more outliers, crosstalk may be effectively reduced. For example, when the electronic apparatus 100 identifies a representative value from among the difference values between the values of a plurality of sub-pixels including the one or more outliers 520 and the intermediate value in the bit range of the display, the difference value between the one or more outliers 520 and the intermediate value in the bit range of the display may be identified as a representative value. In this case, as a filter having low filtering strength weak corresponding to the representative value may be applied to the values of a plurality of sub-pixels, a filtering effect may be weak. However, when the electronic apparatus 100 identifies a representative value among the difference values between the values 540 of a plurality of sub-pixels, except the one or more outliers 520, and the intermediate value in the bit range of the display, a filter having high filtering strength corresponding to a small representative value may be applied to the values of a plurality of sub-pixels, crosstalk may be effectively reduced.

Alternatively, when the electronic apparatus 100 identifies a representative value from among the difference values including the one or more outliers 560, the one or more outliers 560 may be identifies as a representative value. In this case, as a filter having low filtering strength corresponding to a large representative value may be applied to the values of a plurality of sub-pixels, the filtering effect may be weak. However, when the electronic apparatus 100 identifies a representative value among the difference values 580 except the one or more outliers 560, a filter having high filtering strength corresponding to a small representative value is applied to the values of a plurality of sub-pixels, crosstalk may be effectively reduced.

The processes disclosed in relation to FIG. 5A or FIG. 5B is merely one of embodiments for the electronic apparatus 100 to identify a representative value except one or more outliers, and accordingly the representative value may not vary. For example, when the electronic apparatus 100 identifies an outlier from among the values of a plurality of sub-pixels as disclosed in relation to FIG. 5A, or the electronic apparatus 100 identifies an outlier from among the difference values as disclosed in relation to FIG. 5B, the identified outliers all correspond to the 15th view image.

Figure 6A:
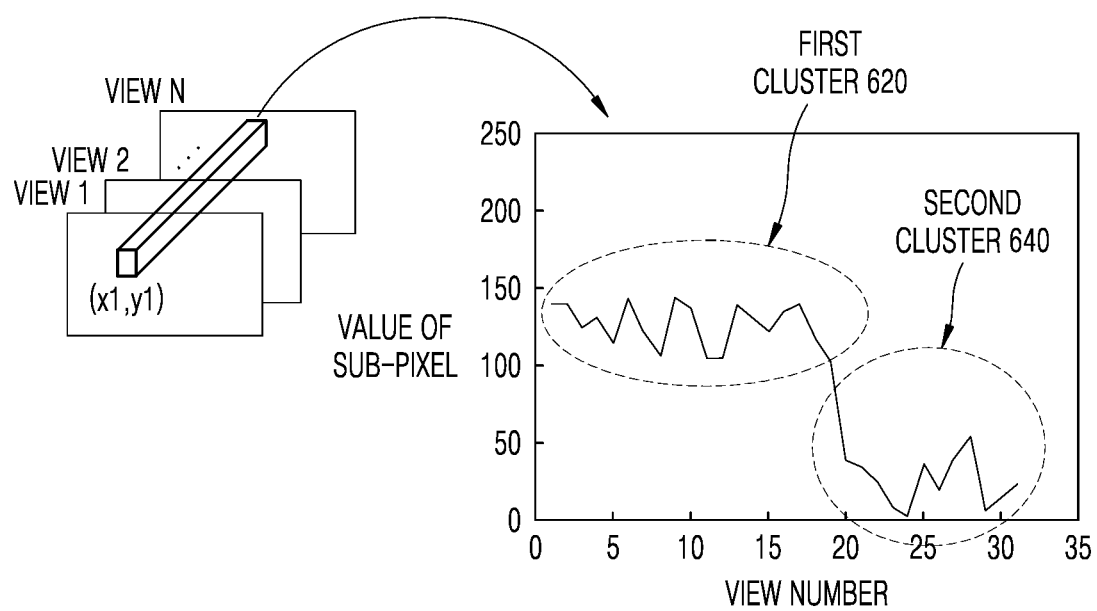
FIG. 6A is a view for explaining a process in which an electronic apparatus, by performing clustering, identifies a representative value among the difference values between the values of the sub-pixels corresponding to the first position in a plurality of view images and the intermediate value in the bit range of a display, according to an embodiment of the present disclosure.
Figure 6B:
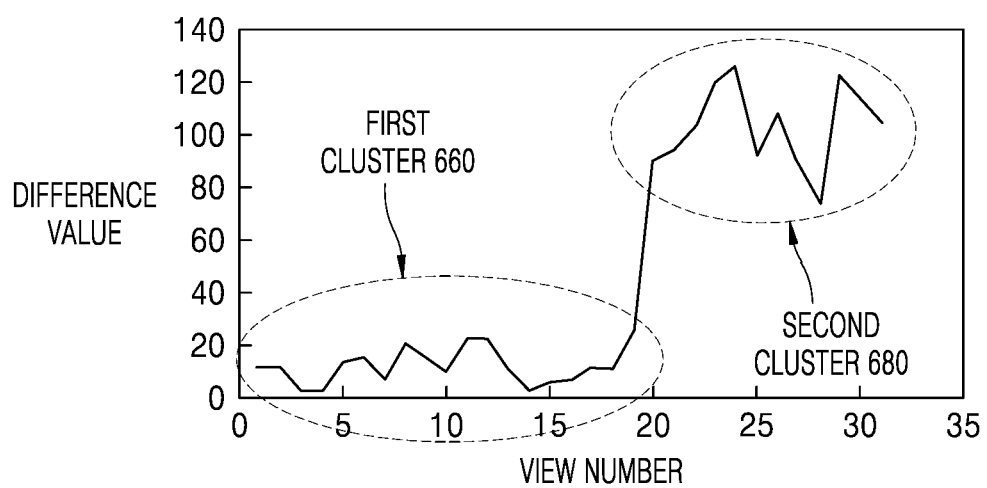
FIG. 6B is a view for explaining a process in which an electronic apparatus, by performing clustering, identifies the representative value among the difference values between the values of the sub-pixels corresponding to the first position in a plurality of view images and the intermediate value in the bit range of a display, according to an embodiment of the present disclosure.

FIGS. 6A and 6B are views for explaining a process in which the electronic apparatus 100, by performing clustering, identify a representative value among the difference values between the values of the sub-pixels corresponding to the first position in a plurality of view images and the intermediate value in the bit range of a display, according to embodiments of the present disclosure Referring to FIG. 6A, the electronic apparatus 100 may cluster the values of the sub-pixels corresponding to the first position in a plurality of view images into two or more clusters. For example, when the electronic apparatus 100 obtains the thirty-one view images, the electronic apparatus 100 may identify the first position corresponding to the coordinate ($x_1$, $y_1$) in each of the thirty-one view images, and identify the values of sub-pixels corresponding to the first position. The electronic apparatus 100 may cluster, by using a clustering algorithm, the values of thirty-one sub-pixels into a first cluster 620 and a second cluster 640. The electronic apparatus 100 may identify each representative value among the difference values between the values of sub-pixels included in each of the first cluster 620 and the second cluster 640 and the intermediate value in the bit range of the display, and set the representative value of the first position to include the representative value of the first cluster 620 and the representative value of the second cluster 640.

Referring to FIG. 6B, the electronic apparatus 100 may cluster the difference values between the values of the sub-pixels corresponding to the first position in a plurality of view images and the intermediate value in the bit range of the display into two or more clusters. For example, when the electronic apparatus 100 obtains the thirty-one view images, the electronic apparatus 100 may identify the first position corresponding to the coordinate ($x_1$, $y_1$) in each of the thirty-one view images, and identify the difference values between the values of sub-pixels corresponding to the first position and the intermediate value in the bit range of the display. The electronic apparatus 100 may cluster, by using the clustering algorithm, thirty-one difference values into a first cluster 660 and a second cluster 680. The electronic apparatus 100 may identify each representative value among the difference values included in the clusters with respect to each of the first cluster 660 and the second cluster 680, and set the representative value of the first position to include the representative value of the first cluster 660 and the representative value of the second cluster 680.

According to an embodiment, as the electronic apparatus 100 may identify the representative value by performing clustering, crosstalk may be effectively reduced. For example, when the electronic apparatus 100 identifies a representative value without performing clustering on the values of the sub-pixels corresponding to the first position, the representative value of the first position may be identified from the difference values between the values of a plurality of sub-pixels included in the second cluster 640 and the intermediate value in the bit range of the display. In this case, as a filter having low filtering strength corresponding to a large representative value may be applied to the values of a plurality of sub-pixels included in the first cluster 620, the filtering effect may be weak. However, when the electronic apparatus 100 clusters the values of a plurality of sub-pixels into the first cluster 620 and the second cluster 640, a small difference value may be identified as the representative value of the first cluster 620. As a result, as a filter having high filtering strength corresponding to a small representative value may be applied to the values of a plurality of sub-pixels included in the first cluster 620, the electronic apparatus 100 may effectively reduce crosstalk.

Alternatively, when the electronic apparatus 100 identifies a representative value without performing clustering on the difference values between the values of the sub-pixels corresponding to the first position and the intermediate value in the bit range of the display, the representative value of the first position may be identified from the difference values included in the second cluster 680. In this case, as a filter having low filtering strength corresponding to a large representative value may be applied to the values of a plurality of sub-pixels corresponding to the first cluster 660, the filtering effect may be weak. However, when the electronic apparatus 100 clusters the difference values into the first cluster 660 and the second cluster 680, a small difference value may be identified as the representative value of the first cluster 660. As a result, as a filter having high filtering strength corresponding to a small representative value may be applied to the values of a plurality of sub-pixels corresponding to the first cluster 660, the electronic apparatus 100 may effectively reduce crosstalk.

However, the processes disclosed in relation to FIG. 6A or FIG. 6B is merely one of embodiments to identify a representative value the first position as the electronic apparatus 100 performs clustering, and accordingly representative value may not vary. For example, as disclosed in relation to FIG. 6A, when the electronic apparatus 100 clusters the values of a plurality of sub-pixels, the first cluster 620 includes values corresponding to the $1^{st}$ to $19^{th}$ view images, and the second cluster 640 includes values corresponding to the $20^{th}$ to $31^{st}$ view images. Likewise, as disclosed in relation to FIG. 6B, when the electronic apparatus 100 clusters difference values, the first cluster 660 includes values corresponding to the $1^{st}$ to $19^{th}$ view images, and the second cluster 680 includes values corresponding to the $20^{th}$ to $31^{st}$ view images.

Figure 7:
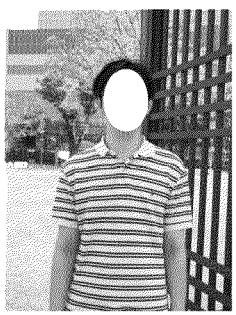
FIG. 7 is a view for explaining a process in which an electronic apparatus generates a crosstalk map, according to an embodiment of the present disclosure.
Figure 7:
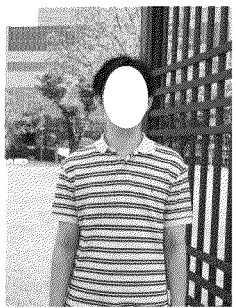
Figure 7:
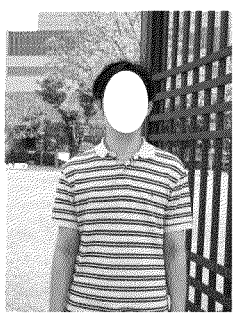
Figure 7:
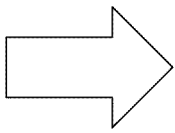
Figure 7:
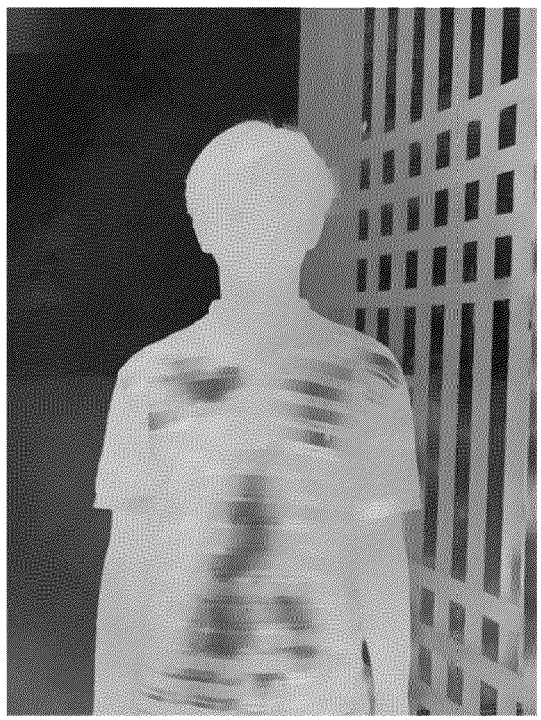

FIG. 7 is a view for explaining a process in which the electronic apparatus 100 generates a crosstalk map, according to an embodiment of the present disclosure.

According to an embodiment, the electronic apparatus 100 may obtain a plurality of view images, and generate a crosstalk map based on the view images. For example, the electronic apparatus 100 may obtain view images 720 to 760 obtained by capturing difference scenes so that a user watches different images according to watching positions. The electronic apparatus 100 may identify a representative value from among the difference values between the values of the sub-pixels corresponding to the first position in the view images 720 to 760 and the intermediate value in the bit range of the display, and set the identified representative value as the value of the first position in a crosstalk map.

According to an embodiment, the electronic apparatus 100 may apply a filter having filtering strength corresponding to the value of the first position in a crosstalk map 780 to the sub-pixels corresponding to the first position in the view images 720 to 760. For example, the electronic apparatus 100 may apply a filter having low filtering strength value to a portion having a large value (or a bright portion), and a filter having high filtering strength to a portion having a small value (or a dark portion).

Figure 8A:
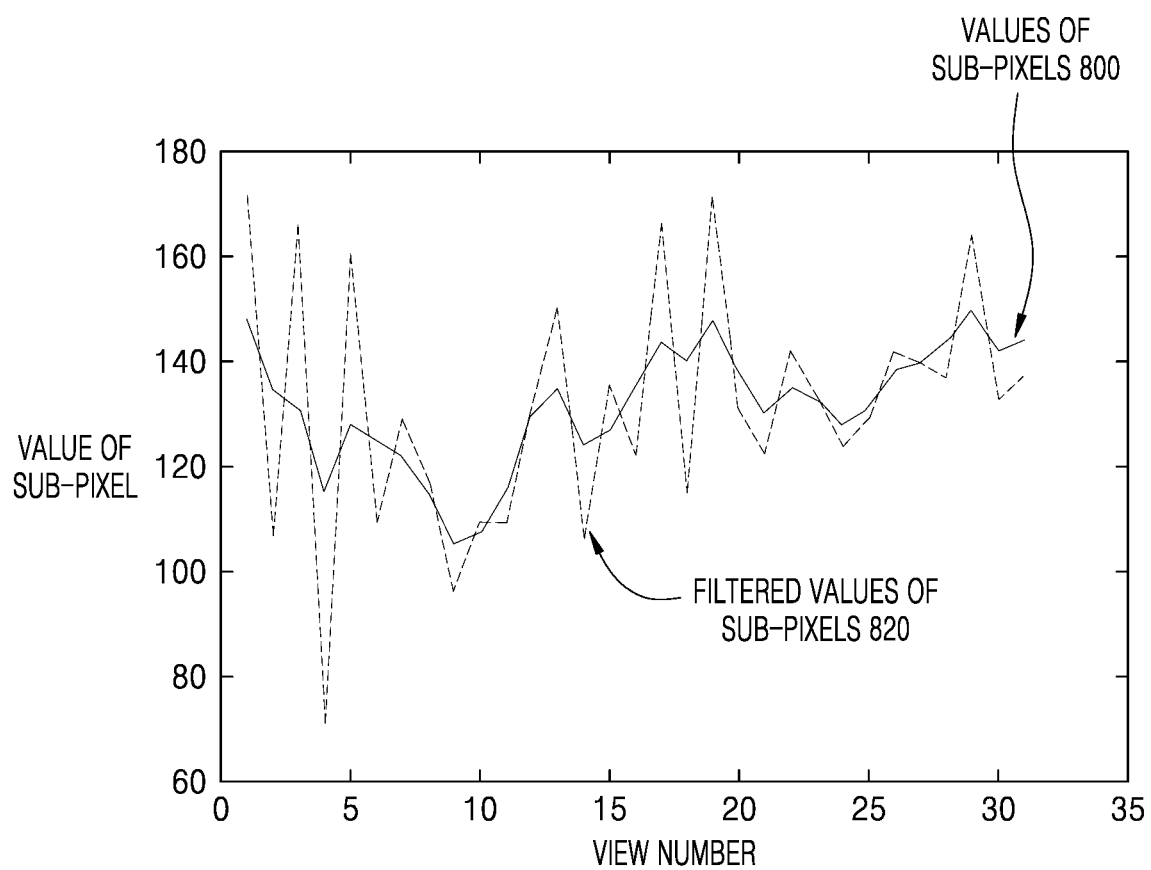
FIG. 8A is a view for explaining a process in which an electronic apparatus filters a plurality of view images, according to an embodiment of the present disclosure.
Figure 8B:
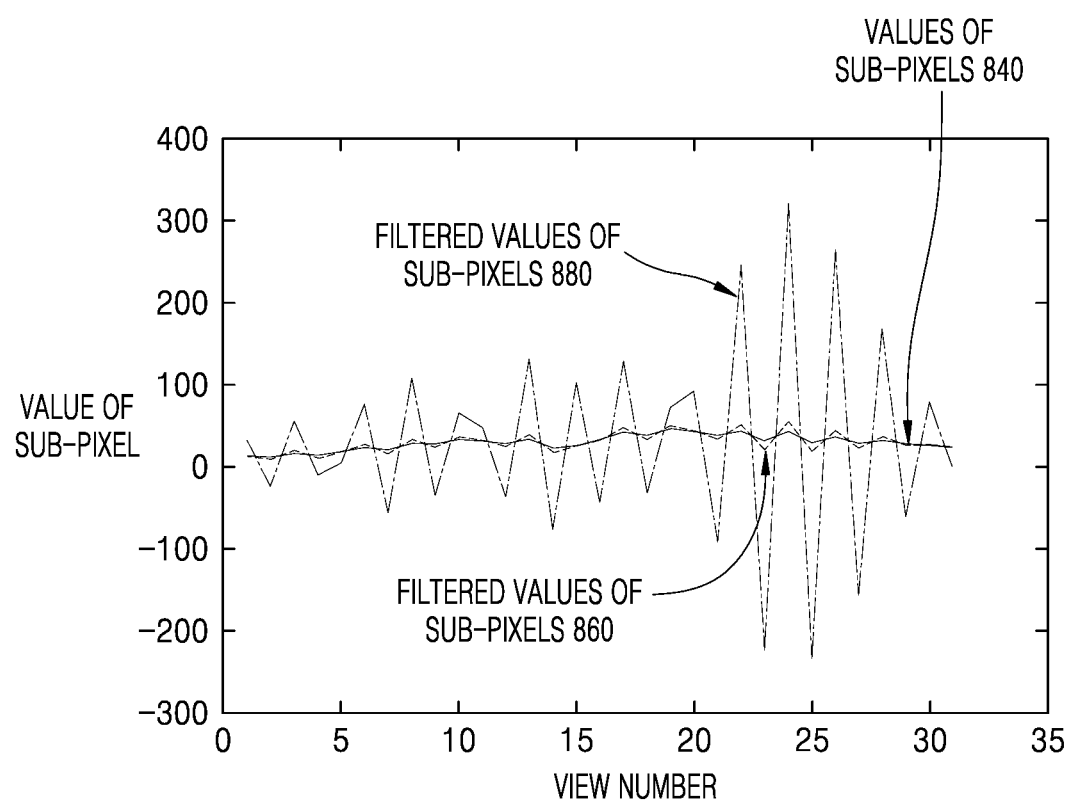
FIG. 8B is a view for explaining the process in which an electronic apparatus filters a plurality of view images, according to an embodiment of the present disclosure.

FIGS. 8A and 8B are views for explaining a process in which the electronic apparatus 100 filters a plurality of view images, according to embodiments of the present disclosure.

FIG. 8A illustrates a case in which the values of the sub-pixels corresponding to the first position in a plurality of view images are distributed around the intermediate value in the bit range of the display, according to an embodiment. For example, when the values of a plurality of sub-pixels according to the bit range of the display range from 0 to 255, values 800 of the sub-pixels corresponding to the first position in the thirty-one view images may be distributed around the intermediate value of 128.

According to an embodiment, the electronic apparatus 100 may identify a representative value from among the difference values between the values 800 of the sub-pixels and the intermediate value in the bit range of the display, and determine filtering strength corresponding to the representative value based on the correspondence map. The electronic apparatus 100 may obtain filtered values 820 of sub-pixels by applying a filter having the determined filtering strength to the sub-pixels corresponding to the first position.

According to an embodiment, as illustrated in FIG. 8A, when the values 800 of the sub-pixels are distributed around the intermediate value in the bit range of the display, the electronic apparatus 100 may apply a filter having high filtering strength corresponding to a small difference value to a plurality of sub-pixels, based on the correspondence map. In this case, even when a filter having high filtering strength is applied to a plurality of sub-pixels, as the values 800 of the sub-pixels are distributed around the intermediate value in the bit range of the display, the filtered values 820 of sub-pixels may be included in the range of the sub-pixel values according to the bit range of the display.

FIG. 8B illustrates a case in which the values of the sub-pixels corresponding to the first position in a plurality of view images are not distributed around the intermediate value in the bit range of the display, according to an embodiment. For example, when the values of a plurality of sub-pixels according to the bit range of the display range from 0 to 255, values 840 of the sub-pixels corresponding to the first position in the thirty-one view images may be distributed around a boundary value of the bit range of the display.

According to an embodiment, the electronic apparatus 100 may identify a representative value from among the difference values between the values 840 of the sub-pixels and the intermediate value in the bit range of the display, and determine filtering strength corresponding to the representative value based on the correspondence map. The electronic apparatus 100 may obtain filtered values 860 of the sub-pixels by applying a filter having the determined filtering strength to the sub-pixels corresponding to the first position.

According to an embodiment, as illustrated in FIG. 8B, when the values 840 of the sub-pixels are distributed around the boundary value of the bit range of the display, the electronic apparatus 100 may apply a filter having low filtering strength corresponding to a large difference value to a plurality of sub-pixels, based on the correspondence map. In this case, as a filter having low filtering strength is applied to a plurality of sub-pixels, even when the values 840 of the sub-pixels are distributed around the boundary value of the bit range of the display, the filtered values 860 of the sub-pixels may be included in the range of the sub-pixel values according to the bit range of the display.

When the electronic apparatus 100 applies a filter having high filtering strength to a plurality of sub-pixels, not based on the correspondence map, an overflow that filtered values 880 of sub-pixels are out of the sub-pixel value range according to the bit range of the display may occur.

Accordingly, as the electronic apparatus 100 applies a filter having filtering strength determined based on the correspondence map to each sub-pixel according to a position in a plurality of view images, the view images may be effectively filtered without overflow.

FIGS. 9A to 9E are views for explaining a process in which the electronic apparatus 100 determines filtering strength corresponding to the representative value, based on a correspondence map indicating a correspondence relationship between the filtering strength and a difference value between the values of the sub-pixels and the intermediate value in the bit range of a display, according to embodiments of the present disclosure.

Figure 9A:
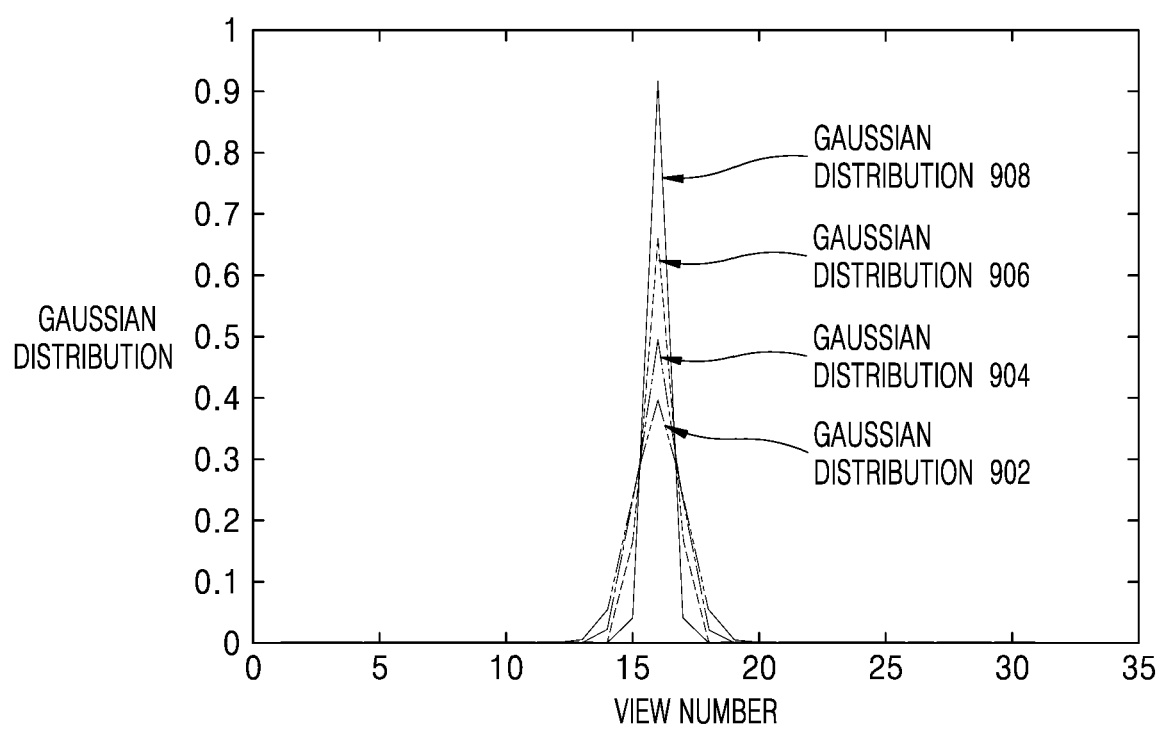
FIG. 9A is a view for explaining a process in which an electronic apparatus determines filtering strength corresponding to the representative value, based on a correspondence map indicating a correspondence relationship between the filtering strength and a difference value between the values of the sub-pixels and the intermediate value in the bit range of a display, according to an embodiment of the present disclosure.

FIG. 9A illustrates an example of a result of modeling interference of light due to crosstalk, according to an embodiment of the present disclosure. For example, the interference of light of the sub-pixel corresponding to the first position in a current view image affecting sub-pixels corresponding to the first position in adjacent peripheral view images may be modeled by a Gaussian distribution as follows.

$$f(x) = \frac{1}{\sqrt{2\pi\sigma^2}} \exp\left(-\frac{x^2}{2\sigma^2}\right)$$

In other words, according to a degree of the interference of light of the sub-pixel corresponding to the first position in a current view image affecting sub-pixels corresponding to the first position in adjacent peripheral view images, a modeled Gaussian distribution may have a different parameter or sigma ($\sigma$) value.

Referring to FIG. 9A, the interference of light of a sub-pixel corresponding to the first position in the 16th view image affecting sub-pixels corresponding to the first position in adjacent peripheral view images may be modeled according to a degree thereof to a Gaussian distribution 902 having a sigma value of 1, a Gaussian distribution 904 having a sigma value of 0.8, a Gaussian distribution 906 having a sigma value of 0.6, or a Gaussian distribution 908 having a sigma value of 0.4. In other words, as the interference of light of a sub-pixel of a current view image affecting the sub-pixels of the adjacent peripheral view images increases, the interference of light of the sub-pixel of a current view image may be modeled to a Gaussian distribution having a greater sigma value.

However, this is merely an embodiment, and the interference of light of the sub-pixel corresponding to the first position in the current view image affecting the sub-pixels corresponding to the first position in the adjacent peripheral view images may be modeled not only to a Gaussian distribution, but to an appropriate distribution.

Figure 9B:
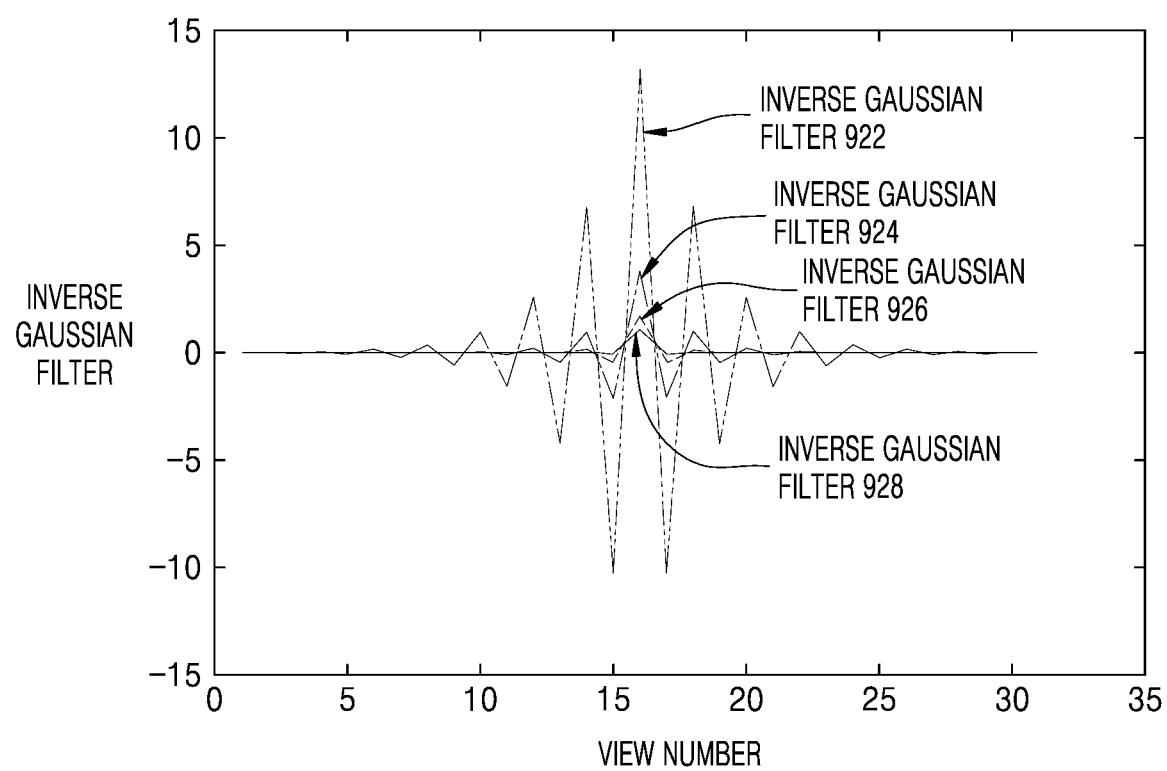
FIG. 9B is a view for explaining a process in which an electronic apparatus determines the filtering strength corresponding to the representative value, based on the correspondence map indicating the correspondence relationship between the filtering strength and the difference values between the values of the sub-pixels and the intermediate value in the bit range of a display, according to an embodiment of the present disclosure.

FIG. 9B illustrates an example of a crosstalk reduction filter according to an embodiment of the present disclosure. According to an embodiment, the electronic apparatus 100 may obtain a crosstalk reduction filter based on the result of modeling the interference of light due to crosstalk. For example, when the interference of light of the sub-pixel corresponding to the first position in the current view image affecting the sub-pixels corresponding to the first position in the adjacent peripheral view images is modeled to a Gaussian distribution, the electronic apparatus 100 may obtain an inverse Gaussian filter as follows.

$$f(x) = \frac{1}{\sqrt{2\pi\sigma^2}} \exp\left(-\frac{x^2}{2\sigma^2}\right)$$

$$invGaussFilter = f^{-1}$$

In other words, the electronic apparatus 100 may obtain an inverse Gaussian filter having a different sigma value according to a degree of the interference of light of the sub-pixel corresponding to the first position in the current view image affecting the sub-pixels corresponding to the first position in the adjacent peripheral view images.

Referring to FIG. 9B, according to a degree of the interference of light of a sub-pixel corresponding to the first position in the 16th view image affecting sub-pixels corresponding to the first position in adjacent peripheral view images, the electronic apparatus 100 may obtain an inverse Gaussian filter 922 having a sigma value of 1, an inverse Gaussian filter 924 having a sigma value of 0.8, an inverse Gaussian filter 926 having a sigma value of 0.6, or an inverse Gaussian filter 928 having a sigma value of 0.4. In this case, as the sigma value of an inverse Gaussian filter increases, a weight to be applied to the values of sub-pixels of a current view image and peripheral view images adjacent to the current view image may be increased.

However, this is merely an embodiment, and the electronic apparatus 100 may obtain not only an inverse Gaussian filter, but also an appropriate type crosstalk reduction filter.

Figure 9C:
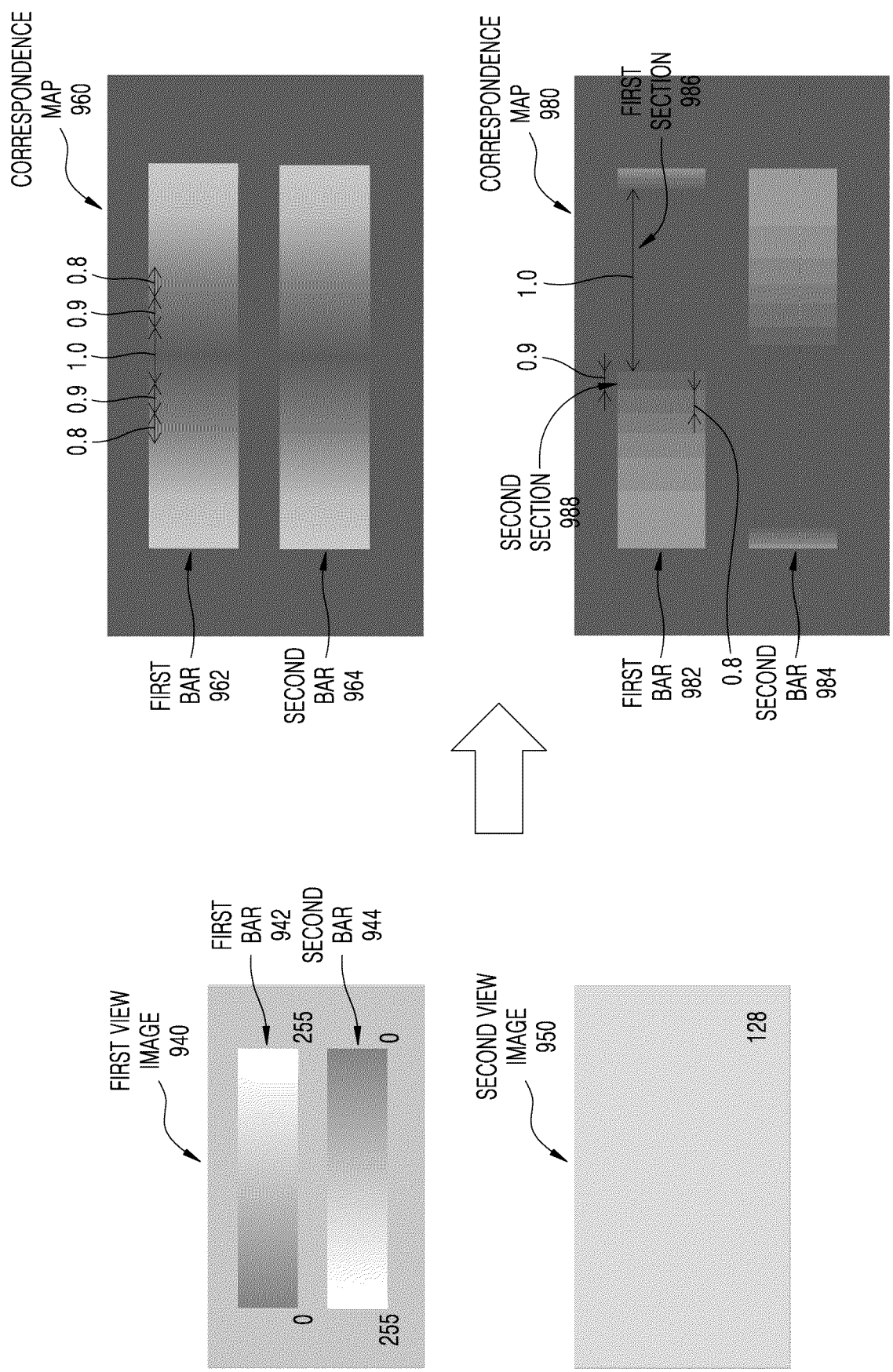
FIG. 9C is a view for explaining a process in which an electronic apparatus determines the filtering strength corresponding to the representative value, based on the correspondence map indicating the correspondence relationship between the filtering strength and the difference values between the values of the sub-pixels and the intermediate value in the bit range of a display, according to an embodiment of the present disclosure.

FIG. 9C illustrates an example of a correspondence map indicating a correspondence relationship between a difference values between the values of the sub-pixels and the intermediate value and filtering strength, according to an embodiment of the present disclosure.

According to an embodiment, the electronic apparatus 100 may obtain a correspondence map for determining optimal filtering strength that prevents occurrence of an overflow when a filter is applied to a certain sub-pixel, according to the difference values between the values of the sub-pixels and the intermediate value in the bit range of the display. For example, when the values of a plurality of sub-pixels according to the bit range of the display range from 0 to 255, the electronic apparatus 100 may obtain a first bar 942 having successive sub-pixel values from 0 to 255, a second bar 944 having successive sub-pixel values from 255 to 0, and a first view image 940 including a background having the intermediate value in the bit range of the display. Furthermore, the electronic apparatus 100 may obtain a second view image 950 including only a background having the intermediate value in the bit range of the display. In this case, the intermediate value in the bit range of the display may be 128. The electronic apparatus 100 may obtain a correspondence map 960 or a correspondence map 980 showing the correspondence relationship between the filtering strength and the difference values between the values of the sub-pixels and the intermediate value in the bit range of the display, based on the crosstalk occurring when the first view image 940 is input to the $1^{st}$ to the $15^{th}$ view images, and the second view image 950 is input to the $16^{th}$ to the $31^{st}$ view images.

According to an embodiment, the correspondence map obtained based on the first view image 940 and the second view image 950 may have the same shape as any one of the correspondence map 960 and the correspondence map 980 according to whether gamma correction is performed. For example, when the electronic apparatus 100 does not perform gamma correction, a correspondence map having the same shape as the correspondence map 960 may be obtained, and when the electronic apparatus 100 performs gamma correction, a correspondence map having the same shape as the correspondence map 980 may be obtained.

According to an embodiment, the value of the first position of the correspondence map 960 may mean a difference values between the values of the sub-pixels corresponding to the first position in the first view image 940 and the intermediate value in the bit range of the display. For example, a first bar 962 of the correspondence map 960 may include difference values between values of sub-pixels of the first bar 942 of the first view image 940 and the intermediate value in the bit range of the display, and a second bar 964 of the correspondence map 960 may include difference values between values of sub-pixels of the second bar 944 of the first view image 940 and the intermediate value in the bit range of the display. Accordingly, the first bar 962 and the second bar 964 may indicate the same bar having a symmetrical shape.

According to an embodiment, the value of the first position of the correspondence map 980 may mean the difference values between the values of the sub-pixels corresponding to the first position in the first view image 940 and the intermediate value in the bit range of the display. For example, a first bar 982 of the correspondence map 980 may include the difference values between the values of sub-pixels of the first bar 942 of the first view image 940 and the intermediate value in the bit range of the display, and a second bar 984 of the correspondence map 980 may include the difference values between the values of sub-pixels of the second bar 944 of the first view image 940 and the intermediate value in the bit range of the display. As the electronic apparatus 100 performs gamma correction in a process of obtaining the correspondence map 980, a linear sub-pixel value is converted into a non-linear brightness value, and thus, the first position in the first bar 982 or the second bar 984 corresponding to the first position in the first bar 942 or the second bar 944 may be changed.

According to an embodiment, the correspondence map 960 or the correspondence map 980 may indicate a correspondence relationship between the filtering strength and the difference values between the values of the sub-pixels and the intermediate value in the bit range of the display. For example, when the interference of light due to crosstalk is modeled to a Gaussian distribution, the correspondence map 960 or the correspondence map 980 may indicate a correspondence relationship between the sigma value and the difference values between the values of the sub-pixels and the intermediate value in the bit range of the display. The sigma value may mean a value that allows a filtering result value, which is obtained when a filter having a sigma value that is the same as or less than a sigma value corresponding to the difference value between the value of a certain sub-pixel and the intermediate value in the bit range of the display is applied to a certain sub-pixel, to be included in the range of the sub-pixel values according to the bit range of the display.

According to an embodiment, the electronic apparatus 100 may determine filtering strength corresponding to the representative value among the difference values between the values of the sub-pixels corresponding to the first position in a plurality of view images and the intermediate value in the bit range of the display, based on the correspondence map 960 or the correspondence map 980. For example, when the representative value is included in a first section 986, the electronic apparatus 100 may determine the filtering strength as a sigma value of 1, and when the representative value is included in a second section 988, the electronic apparatus 100 may determine the filtering strength as a sigma value of 0.9.

According to an embodiment, as the difference values between the values of the sub-pixels and the intermediate value in the bit range of the display decreases, the filtering strength corresponding to the difference value may be increased. For example, when the interference of light due to crosstalk is modeled to a Gaussian distribution, as the difference values between the values of the sub-pixels and the intermediate value in the bit range of the display decreases, the sigma value corresponding to the difference value may be further increased. Here, high filtering strength may mean that, for filtering of sub-pixels of a current view image, a weight applied not only to a current view image, but also to the values of sub-pixels of peripheral view images adjacent to the current view image, is high.

However, this is merely an embodiment, and the electronic apparatus 100 may obtain a correspondence map having a different shape, based on view images of different numbers or different shapes.

Figure 9D:
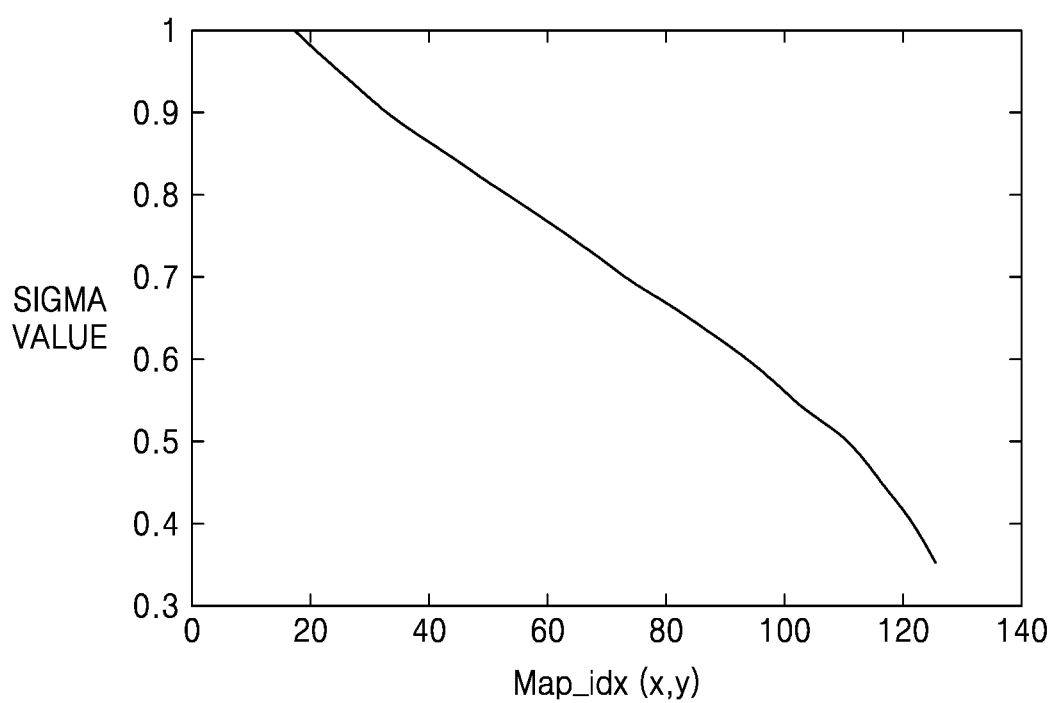
FIG. 9D is a view for explaining a process in which an electronic apparatus determines the filtering strength corresponding to the representative value, based on the correspondence map indicating the correspondence relationship between the filtering strength and the difference values between the values of the sub-pixels and the intermediate value in the bit range of a display, according to an embodiment of the present disclosure.
Figure 9E:
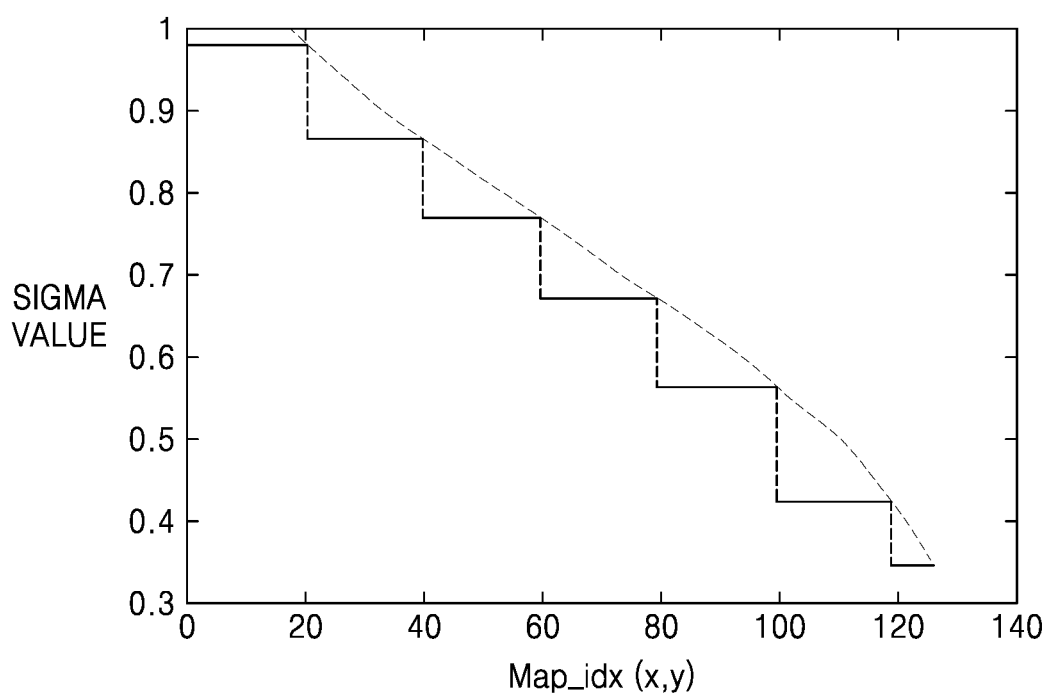
FIG. 9E is a view for explaining a process in which an electronic apparatus determines the filtering strength corresponding to the representative value, based on the correspondence map indicating the correspondence relationship between the filtering strength and the difference values between the values of the sub-pixels and the intermediate value in the bit range of a display, according to an embodiment of the present disclosure.

FIG. 9D and FIG. 9E illustrate an example of a correspondence function showing a correspondence relationship between the filtering strength and the difference values between the values of the sub-pixels and the intermediate value, according to an embodiment of the present disclosure.

According to an embodiment, the electronic apparatus 100 may obtain a correspondence function that determines the filtering strength that allows a value, resulting from applying a filter to a certain sub-pixel, to be included in the range of pixel values according to the bit range of the display, according to the difference value between the value of the certain sub-pixel and the intermediate value in the bit range of the display, based on the correspondence map 960 or the correspondence map 980. In this case, the correspondence function may have a continuous form as illustrated in FIG. 9D, or a discrete form as illustrated in FIG. 9E.

According to an embodiment, the electronic apparatus 100 may determine the filtering strength corresponding to the representative value among the difference values between the values of the sub-pixels corresponding to the first position in a plurality of view images and the intermediate value in the bit range of the display, based on the correspondence function. For example, when the interference of light due to crosstalk is modeled to a Gaussian distribution, the electronic apparatus 100 may determine a sigma value corresponding to the representative value, based on the correspondence function.

Figure 10:
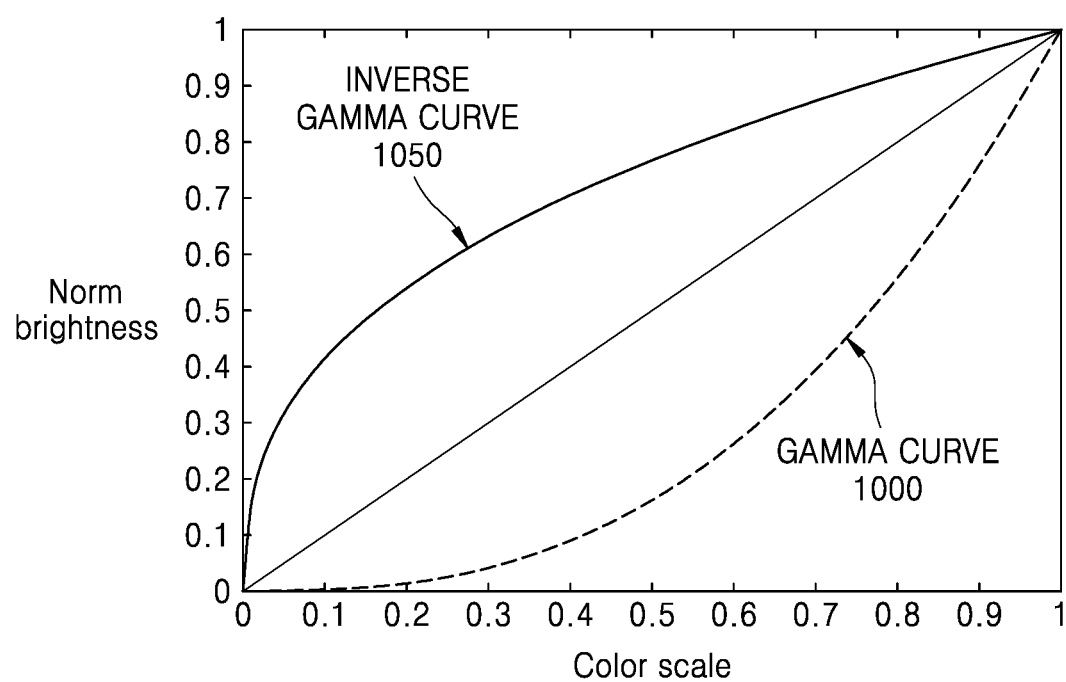
FIG. 10 is a view for explaining a process in which an electronic apparatus performs gamma correction or inverse gamma correction, according to an embodiment of the present disclosure.

FIG. 10 is a view for explaining a process in which the electronic apparatus 100 performs gamma correction or inverse gamma correction, according to an embodiment of the present disclosure.

According to an embodiment, the electronic apparatus 100 may convert a value of a pixel domain into a value of a brightness domain, by performing gamma correction on values of a plurality of sub-pixels based on a gamma curve 1000. Furthermore, the electronic apparatus 100 may obtain convert a value of a brightness domain into a value of a pixel domain, by performing inverse gamma correction on values of a plurality of sub-pixels changed by applying a filter, based on an inverse gamma curve 1050.

According to an embodiment, when the electronic apparatus 100 performs gamma correction, operations from the gamma correction to the inverse gamma correction may be performed in the brightness domain. For example, the electronic apparatus 100 may identify a representative value from among the difference values between brightness values of sub-pixels for each sub-pixel according to a position in a plurality of view images and an intermediate value in a range of the brightness values of sub-pixels. Furthermore, the electronic apparatus 100 may obtain a correspondence map that determines the filtering strength that allows a result value of applying a filter to a certain sub-pixel to be included in the range of brightness values, according to the difference value between the brightness value of the certain sub-pixel and the intermediate value in the range of brightness values. The electronic apparatus 100 may determine filtering strength corresponding to the representative value based on the correspondence map, and apply the filter having the determined filtering strength to a plurality of sub-pixels. In addition, the operations disclosed in relation to FIGS. 3A to 9E may be performed in the brightness domain.

However, the gamma correction and the inverse gamma correction, which are not essential operations, may be omitted according to embodiments.

FIGS. 11A to 11F illustrate an example of a display according to embodiments of the present disclosure.

According to an embodiment, the display may have not only a single layer structure, but also a multi-layer structure. For example, the display may have various structures including a backlight unit (BLU), a lenticular lens, and a color panel and/or a monochrome panel. The backlight unit may generate light, and the lenticular lens may refract the light to be split into two or more light rays. Furthermore, the color panel and the monochrome panel may express color by controlling transmittance of light. The structure of the display 110 included in the electronic apparatus 100 according to an embodiment is described below with reference to FIGS. 11A to 11F.

Figure 11A:
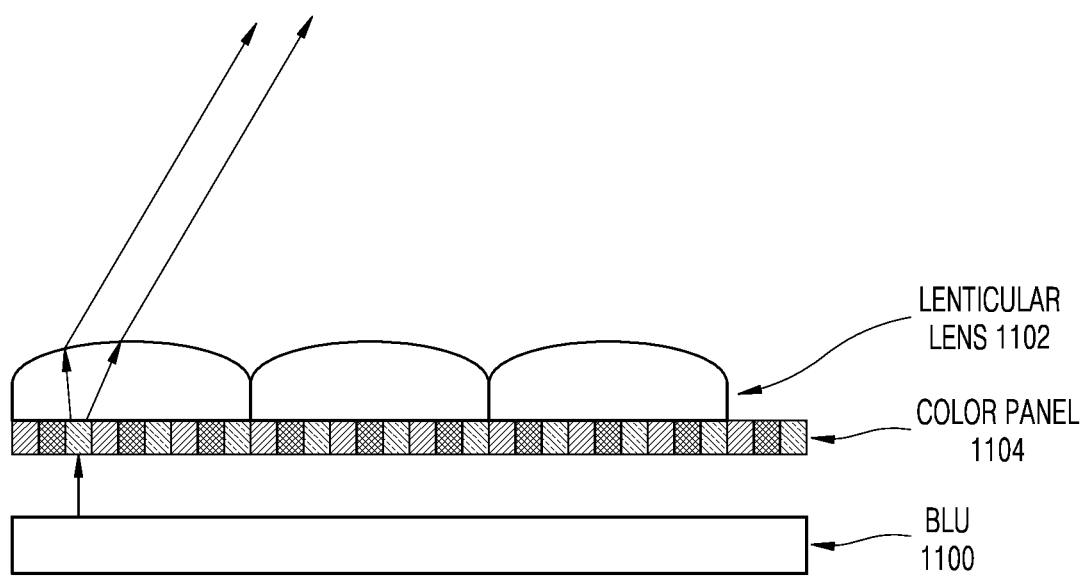
FIG. 11A illustrates an example of a display according to an embodiment of the present disclosure.

FIG. 11A illustrates a display including a BLU 1100, a lenticular lens 1102, and a color panel 1104. According to an embodiment, the color panel 1104 may be arranged above the BLU 1100, and the lenticular lens 1102 may be arranged above the color panel 1104. Accordingly, light generated from the BLU 1100 may pass through the color panel 1104, and then may be refracted by the lenticular lens 1102 to be split into two or more light rays.

Figure 11B:
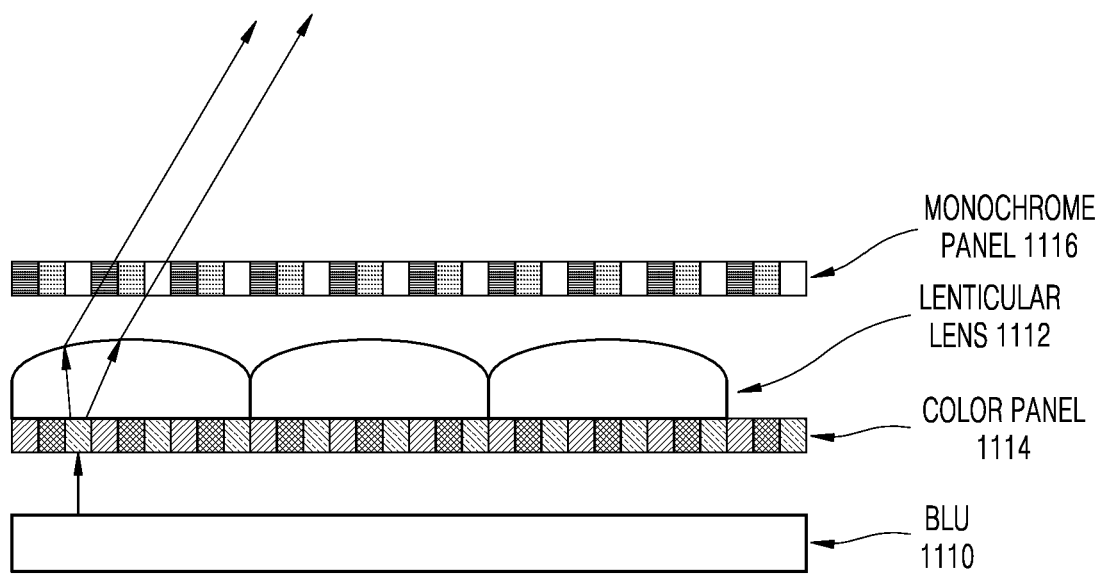
FIG. 11B illustrates an example of a display according to an embodiment of the present disclosure.

FIG. 11B illustrates a display including a BLU 1110, a lenticular lens 1112, a color panel 1114, and a monochrome panel 1116. According to an embodiment, the color panel 1114 may be arranged above the BLU 1110, and the lenticular lens 1112 and the monochrome panel 1116 may be arranged above the color panel 1114. Accordingly, light generated from the BLU 1110 may pass through the color panel 1114, and then may be refracted by the lenticular lens 1112 to be split into two or more light rays. The two or more split light rays may pass through a monochrome panel 1116.

Figure 11C:
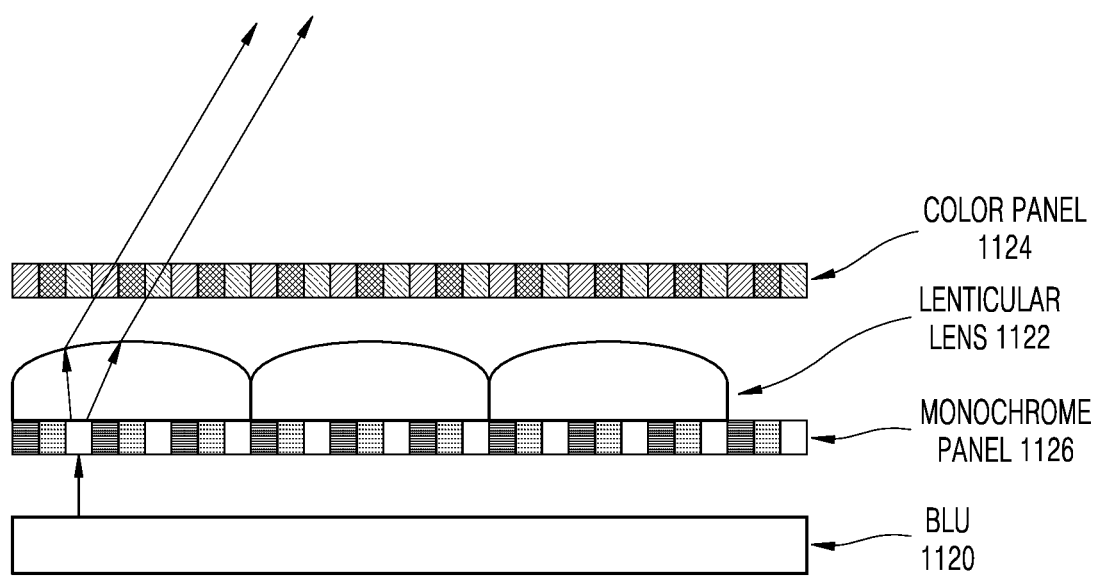
FIG. 11C illustrates an example of a display according to an embodiment of the present disclosure.

FIG. 11C illustrates a display including a BLU 1120, a lenticular lens 1122, a color panel 1124, and a monochrome panel 1126. According to an embodiment, the monochrome panel 1126 may be arranged above the BLU 1120, and the lenticular lens 1122 and the color panel 1124 may be arranged above the monochrome panel 1126. Accordingly, light generated from the BLU 1120 may pass through the monochrome panel 1126, and then may be refracted by the lenticular lens 1122 to be split into two or more light rays. The two or more split light rays may pass through the color panel 1124.

Figure 11D:
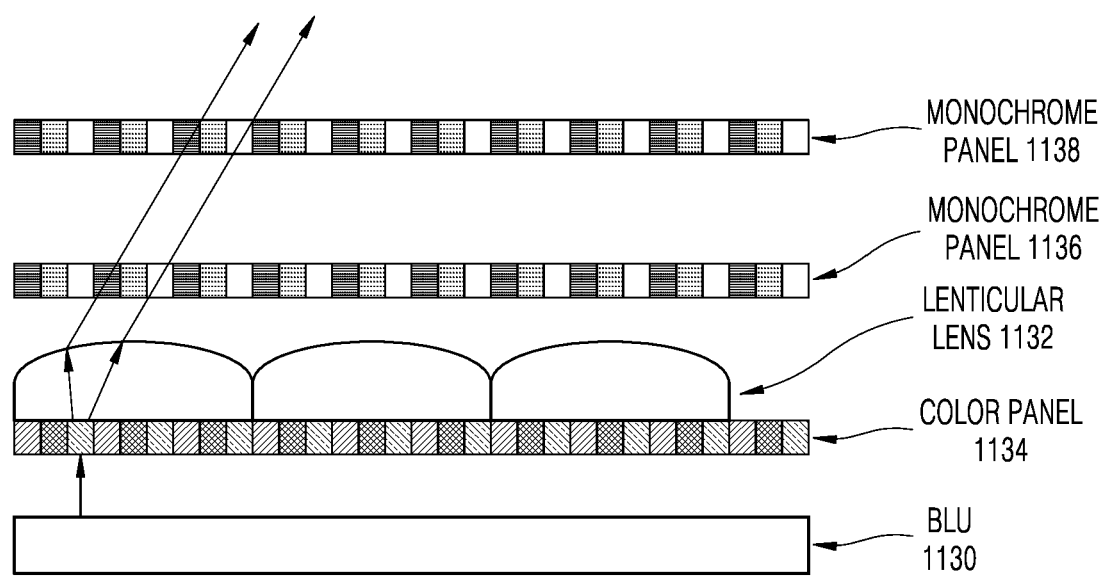
FIG. 11D illustrates an example of a display according to an embodiment of the present disclosure.

FIG. 11D illustrates a display including a BLU 1130, a lenticular lens 1132, a color panel 1134, and two monochrome panels 1136 and 1138. According to an embodiment, the color panel 1134 may be arranged above the BLU 1130, and the lenticular lens 1132 and the two monochrome panels 1136 and 1138 may be arranged above the color panel 1134. Accordingly, light generated by the BLU 1130 may pass through the color panel 1134, and then may be refracted by the lenticular lens 1132 to be split into two or more light rays. The two or more split light rays may successively pass through the two monochrome panels 1136 and 1138.

Figure 11E:
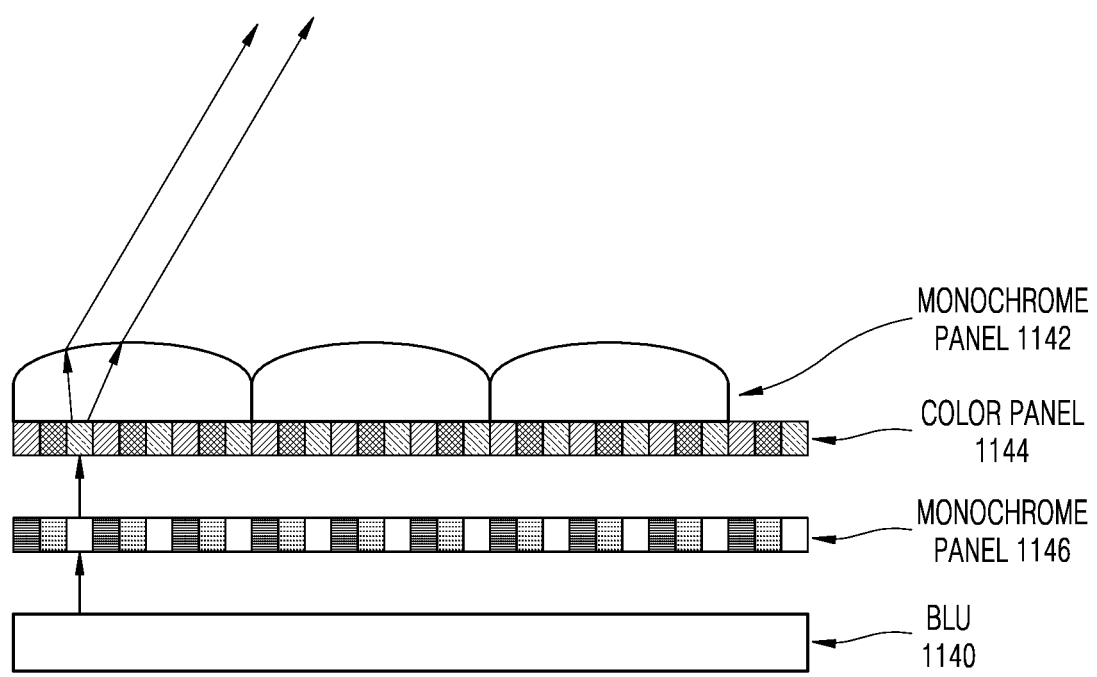
FIG. 11E illustrates an example of a display according to an embodiment of the present disclosure.

FIG. 11E illustrates a display including a BLU 1140, a lenticular lens 1142, a color panel 1144, and a monochrome panel 1146. According to an embodiment, the monochrome panel 1146 may be arranged above the BLU 1140, and the color panel 1144 and the lenticular lens 1142 may be arranged above the monochrome panel 1146. Accordingly, light generated from the BLU 1140 may successively pass through the monochrome panel 1146 and the color panel 1144, and then may be refracted by the lenticular lens 1142 to be split into two or more light rays.

Figure 11F:
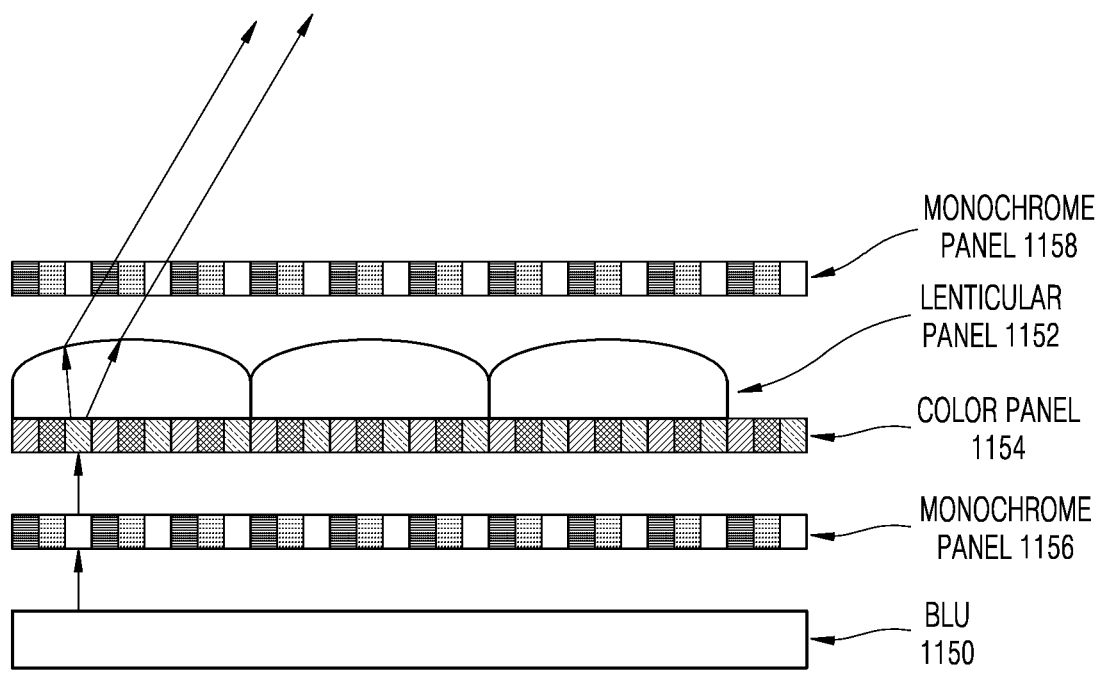
FIG. 11F illustrates an example of a display according to an embodiment of the present disclosure.

FIG. 11F illustrates a display including a BLU 1150, a lenticular lens 1152, a color panel 1154, and the two monochrome panels 1156 and 1158. According to an embodiment, the monochrome panel 1156 and the color panel 1154 may be arranged above the BLU 1150, and the lenticular lens 1152 and the monochrome panel 1158 may be arranged above the monochrome panel 1156 and the color panel 1154. Accordingly, light generated from the BLU 1150 may successively pass through the monochrome panel 1156 and the color panel 1154, and then may be refracted by the lenticular lens 1152 to be split into two or more light rays. The two or more split light rays may pass through the monochrome panel 1158.

However, the structure of the display 110 of the electronic apparatus 100 is not limited to the above-described structures, and may include various types of lenses such as a lenslet array or display panels having various structures. Accordingly, view images rendered through the electronic apparatus 100 may be displayed on the display 110 having the structure described through FIGS. 11A to 11F.

Figure 12:
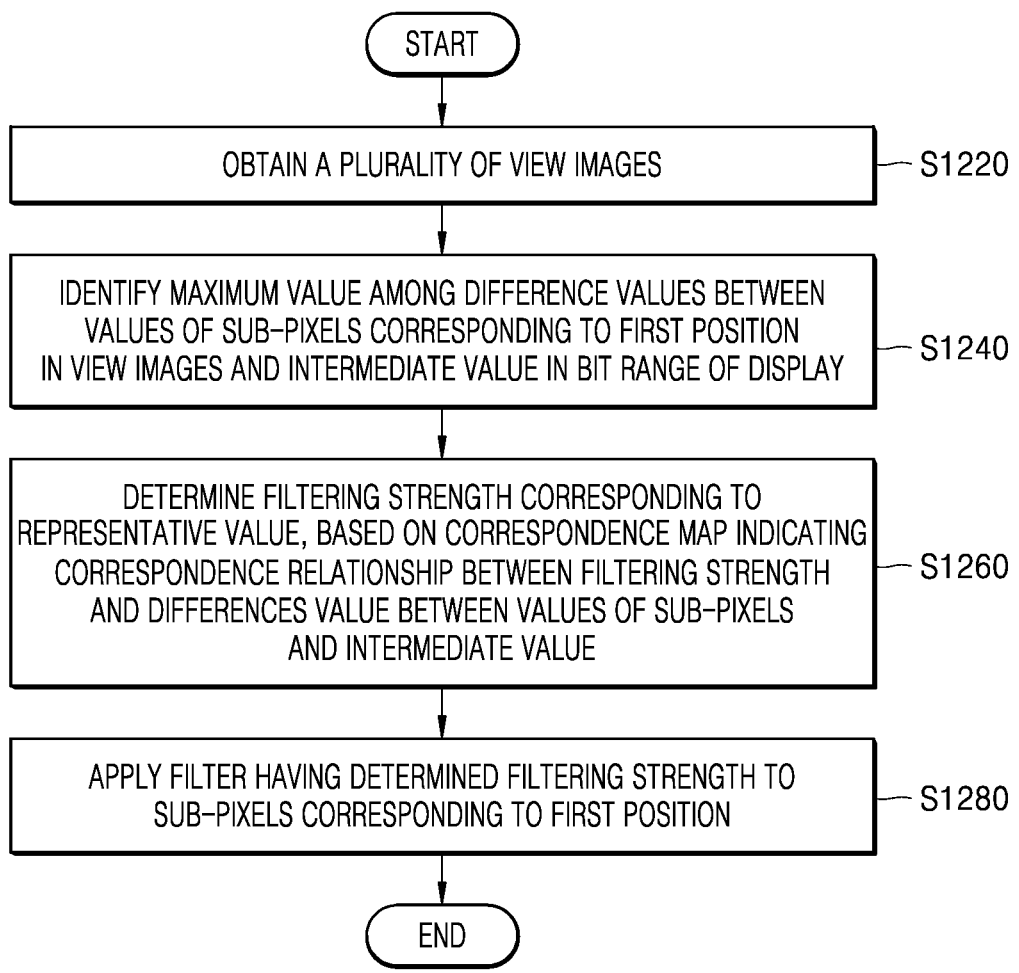
FIG. 12 is a flowchart showing a process in which an electronic apparatus filters a plurality of view images, according to an embodiment of the present disclosure.

FIG. 12 is a flowchart showing a process in which an electronic apparatus filters a plurality of view images, according to an embodiment of the present disclosure.

In S1220, the electronic apparatus may obtain a plurality of view images. According to an embodiment, the view images may mean images obtained by capturing different scenes so that a user may see different images according to user's watching positions. Alternatively, the view images may mean images obtained by capturing different scenes so that user's left eye and right eye may see different images.

In S1240, the electronic apparatus may identify a representative value among difference values between values of sub-pixels corresponding to a first position in a plurality of view images and an intermediate value of a bit range of a display. According to an embodiment, the electronic apparatus may identify a maximum value among the difference values between the values of the sub-pixels corresponding to the first position in a plurality of view images and the intermediate value in the bit range of the display, and set the identified maximum value as a representative value.

According to an embodiment, the electronic apparatus may identify a representative value from among difference values between values of a plurality of sub-pixels corresponding to a first area in a plurality of view images and the intermediate value in the bit range of the display.

According to an embodiment, the electronic apparatus may identify an outlier from among the values of the sub-pixels corresponding to the first position in a plurality of view images, and identify a representative value from among the difference values between the values of sub-pixels except the outlier and the intermediate value in the bit range of the display. Alternatively, the electronic apparatus may identify an outlier from among the difference values between the values of the sub-pixels corresponding to the first position in a plurality of view images and the intermediate value in the bit range of the display, and identify a representative value among the difference values except the outlier.

According to an embodiment, the electronic apparatus may identify one or more sub-pixels that are not used for rendering among the sub-pixels corresponding to the first position in the view images, and identify a representative value from among the difference values between the values of sub-pixels except one or more sub-pixel and the intermediate value in the bit range of the display.

According to an embodiment, the electronic apparatus may cluster values of sub-pixels for each sub-pixel according to a position in a plurality of view images into two or more clusters, and identify each representative value among the difference values between the values of sub-pixels included in each of two or more clusters and the intermediate value in the bit range of the display. Alternatively, the electronic apparatus may cluster the difference values between the values of sub-pixels for each sub-pixel according to a position in a plurality of view images and the intermediate value in the bit range of the display into two or more clusters, and identify each representative value among the difference values included in each of two or more clusters.

In S1260, the electronic apparatus may determine filtering strength corresponding to the representative value, based on the correspondence map indicating a correspondence relationship between the filtering strength and the difference values between the values of the sub-pixels and the intermediate value.

According to an embodiment, the electronic apparatus may determine filtering strength corresponding to the representative value based on the correspondence map that determines the filtering strength that allows a result value of applying a filter to a certain sub-pixel to be included in the range of pixel values according to the bit range of the display, according to the difference value between the value of the certain sub-pixel and the intermediate value in the bit range of the display.

According to an embodiment, the correspondence map may include a relationship in which filtering strength increases as the difference values between the values of the sub-pixels and the intermediate value of the bit range of the display decreases. In this case, high filtering strength may mean that, for filtering of sub-pixels of a current view image, a weight applied not only to a current view image, but also to the values of sub-pixels of peripheral view images adjacent to the current view image, is high.

In S1280, the electronic apparatus may apply the filter having the determined filtering strength to the sub-pixels corresponding to the first position.

According to an embodiment, the electronic apparatus may obtain a filtering result value included in the range of the sub-pixel values according to the bit range of the display, by applying, to a certain sub-pixel, a filter having low filtering strength that is the same as or less than the filtering strength corresponding to the difference value between the value of a certain sub-pixel and the intermediate value in the bit range of the display, based on the correspondence map.

Figure 13:
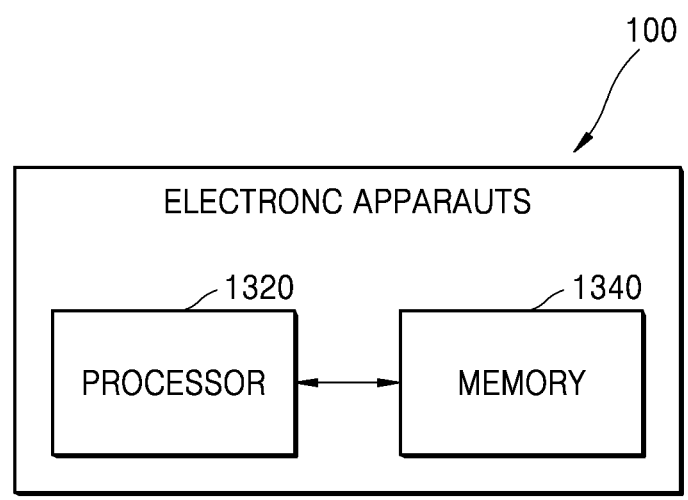
FIG. 13 is a block diagram of an electronic apparatus according to an embodiment of the present disclosure.

FIG. 13 is a block diagram of the electronic apparatus 100 according to an embodiment of the present disclosure.

According to an embodiment, the electronic apparatus 100 may include a processor 1320 and a memory 1340. The processor 1320 may correspond to the processor 120 of FIG. 1, and the memory 1340 may correspond to the memory 130 of FIG. 1. However, the configuration of the electronic apparatus 100 is not limited to the above-description, and the electronic apparatus 100 may include more or less constituent elements.

According to an embodiment, the processor 1320, by executing at least one instruction stored in the memory 1340, may obtain a plurality of view images and identify the representative value among the difference values between the values of the sub-pixels corresponding to the first position in a plurality of view images and the intermediate value in the bit range of the display. Furthermore, the processor 1320, by executing at least one instruction stored in the memory 1340, may determine filtering strength corresponding to the representative value based on the correspondence map indicating a correspondence relationship between the filtering strength and the difference values between the values of the sub-pixels and the intermediate value, and apply a filter having the determined filtering strength to the sub-pixels corresponding to the first position. In this case, the result value of the application of the filter having the determined filtering strength to the sub-pixels corresponding to the first position may be included in the range of the sub-pixel values according to the bit range of the display.

While the present disclosure has been described with reference to example embodiments thereof, it will be apparent to those of ordinary skill in the art that various changes and modifications may be made thereto without departing from the spirit and scope of the present disclosure as set forth in the following claims and their equivalents.

What is claimed is:

1. A method comprising:
    obtaining a plurality of view images;

identifying a representative value from among difference values between values of a plurality of sub-pixels corresponding to a first position in the plurality of view images and an intermediate value of a bit range of a display;

determining a filtering strength corresponding to the representative value, based on a correspondence map indicating a correspondence relationship between a filtering strength and a difference value between a value of a sub-pixel and the intermediate value; and applying a filter having the determined filtering strength to the plurality of sub-pixels corresponding to the first position, wherein a value, resulting from applying the filter having the determined filtering strength to the plurality of sub-pixels corresponding to the first position, is included in a range of sub-pixel values according to the bit range of the display.

2. The method of claim 1, wherein the representative value includes a maximum value from among the difference values between the values of the plurality of sub-pixels corresponding to the first position in the plurality of view images and the intermediate value of the bit range of the display.

3. The method of claim 1, wherein based on an increase in the filtering strength, a weight applied to values of sub-pixels of a current view image and peripheral view images, adjacent to the current view image for filtering of sub-pixels of the current view image increases.

4. The method of claim 1, wherein based on a decrease in the difference value between the value of the sub-pixel and the intermediate value, the filtering strength corresponding to the difference value increases.

5. The method of claim 1, wherein the filter having the filtering strength determined for each of positions in the plurality of view images based on the correspondence map is applied to sub-pixels for each of the positions in the plurality of view images.

6. The method of claim 1, further comprising:
performing gamma correction on the values of the plurality of sub-pixels; and
performing inverse gamma correction on values of the plurality of sub-pixels that are changed by applying the filter having the determined filtering strength corresponding to the representative value,
wherein the identifying of the representative value comprises identifying the representative value from among difference values between a plurality of brightness values of the plurality of sub-pixels and an intermediate value of a range of brightness values of sub-pixel.

7. The method of claim 1, wherein the identifying of the representative value comprises:
identifying at least one outlier from among the difference values between the values of the plurality of sub-pixels and the intermediate value of the bit range of the display; and
identifying the representative value from among the difference values except the at least one outlier.

8. The method of claim 1, wherein the identifying of the representative value comprises:
identifying one or more sub-pixels that are not used for rendering from among the plurality of sub-pixels; and
identifying the representative value from among difference values between values of the plurality of sub-pixels and the intermediate value of the bit range of the display, except values of the identified one or more sub-pixels.

9. The method of claim 1, wherein the first position includes a local area.

10. The method of claim 1, wherein the identifying of the representative value comprises:
identifying a predetermined number of adjacent first view images from among the plurality of view images;
identifying a predetermined number of adjacent second view images from among the plurality of view images;
identifying a first maximum value among difference values between values of sub-pixels corresponding to the first position in the first view images and the intermediate value of the bit range of the display;
identifying a second maximum value among difference values between values of sub-pixels corresponding to the first position in the second view images and the intermediate value of the bit range of the display; and
identifying the representative value from among the first maximum value and the second maximum value.

11. A non-transitory computer-readable storage medium having stored thereon a program, which, when executed by at least one processor, causes the at least one processor to perform the method according to claim 1.

12. An electronic apparatus comprising:
a memory configured to store at least one instruction; and
at least one processor,
wherein the at least one processor is configured to, by executing the at least one instruction:
obtain a plurality of view images;
identify a representative value from among difference values between values of a plurality of sub-pixels corresponding to a first position in the plurality of view images and an intermediate value of a bit range of a display;
determine a filtering strength corresponding to the representative value, based on a correspondence map indicating a correspondence relationship between filtering strength and a difference value between a value of a sub-pixel and the intermediate value; and
apply a filter having the determined filtering strength to the plurality of sub-pixels corresponding to the first position, and
wherein a value resulting from applying the filter having the determined filtering strength to the sub-pixels corresponding to the first position is included in a range of sub-pixel values according to the bit range of the display.

13. The electronic apparatus of claim 12, wherein the representative value includes a maximum value from among the difference values between the values of the plurality of sub-pixels corresponding to the first position in the plurality of view images and the intermediate value of the bit range of the display.

14. The electronic apparatus of claim 12, wherein based on an increase in the filtering strength, a weight applied to values of sub-pixels of a current view image and peripheral view images adjacent to the current view image for filtering of sub-pixels of a current view image increases.

15. The electronic apparatus of claim 12, wherein based on a decrease in the difference value between the value of the sub-pixel and the intermediate value, the filtering strength corresponding to the difference value increases.

16. The electronic apparatus of claim 12, wherein the filter having the filtering strength determined for each of positions in the plurality of view images based on the correspondence map is applied to sub-pixels for each of the positions in the plurality of view images.

17. The electronic apparatus of claim 12, wherein the at least one processor is further configured to:
- perform gamma correction on the values of the plurality of sub-pixels; and
- perform inverse gamma correction on values of the plurality of sub-pixels that are changed by applying the filter having the determined filtering strength corresponding to the representative value, and
- wherein the at least one processor is configured to identify the representative value from among difference values between a plurality of brightness values of the plurality of sub-pixels and an intermediate value of a range of brightness values of sub-pixel.

18. The electronic apparatus of claim 12, wherein the at least one processor is further configured to:
- identify at least one outlier from among the difference values between the values of the plurality of sub-pixels and the intermediate value of the bit range of the display; and
- identify the representative value from among the difference values except the at least one outlier.

19. The electronic apparatus of claim 12, wherein the at least one processor is further configured to:
- identify one or more sub-pixels that are not used for rendering from among the plurality of sub-pixels; and
- identify the representative value from among the difference values between values of the plurality of sub-pixels except values of the one or more sub-pixels and the intermediate value of the bit range of the display.

20. The electronic apparatus of claim 12, wherein the first position includes a local area.

* * * * *